US012586339B2

(12) United States Patent
Cheng et al.

(10) Patent No.: US 12,586,339 B2
(45) Date of Patent: Mar. 24, 2026

(54) METHODS AND SYSTEMS FOR VIDEO PROCESSING

(71) Applicant: ZHEJIANG DAHUA TECHNOLOGY CO., LTD., Zhejiang (CN)

(72) Inventors: Deqiang Cheng, Hangzhou (CN); Chunhuang Zheng, Hangzhou (CN); Jianfeng Wu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 530 days.

(21) Appl. No.: 18/163,247

(22) Filed: Feb. 1, 2023

(65) Prior Publication Data

US 2023/0177796 A1     Jun. 8, 2023

Related U.S. Application Data

(63) Continuation of application No. PCT/CN2021/113072, filed on Aug. 17, 2021.

(30) Foreign Application Priority Data

Aug. 19, 2020     (CN) ......................... 202010838479.1

(51) Int. Cl.
*G06V 10/25*          (2022.01)
*G06T 7/194*          (2017.01)
(Continued)

(52) U.S. Cl.
CPC .............. *G06V 10/25* (2022.01); *G06T 7/194* (2017.01); *G06V 10/751* (2022.01); *G06V 10/764* (2022.01); *G06T 2210/12* (2013.01)

(58) Field of Classification Search
CPC .... G06V 10/25; G06V 10/751; G06V 10/764; G06V 10/62; G06V 10/255; G06V 20/52;
(Continued)

(56) References Cited

U.S. PATENT DOCUMENTS 10,516,911 B1     12/2019   Nielsen et al.
10,630,748 B1      4/2020   Hegar et al.
(Continued)

FOREIGN PATENT DOCUMENTS

CN          106874843 A      6/2017
CN          107333026 A     11/2017
(Continued)

OTHER PUBLICATIONS

The Extended European Search Report in European Application No. 21857679.1 mailed on Nov. 15, 2023, 6 pages.
(Continued)

*Primary Examiner* — John B Strege
(74) *Attorney, Agent, or Firm* — METIS IP LLC

(57) ABSTRACT

A method and a system for video processing, including: determining a target bounding box from an image frame in a video; determining a classification result of a subject in the target bounding box by processing the target bounding box using a recognition model; and determining one or more target image frames to be saved in the video based on the classification result.

14 Claims, 15 Drawing Sheets

(51) Int. Cl.
 *G06V 10/75* (2022.01)
 *G06V 10/764* (2022.01)
(58) Field of Classification Search
 CPC ..... G06T 7/194; G06T 2210/12; H04N 7/188;
 H04N 7/18; H04N 5/144; G08B
 13/19606; G08B 29/186
 See application file for complete search history.

(56) References Cited

U.S. PATENT DOCUMENTS

| | | | |
|---|---|---|---|
| 2016/0275356 A1* | 9/2016 | Kuwahara | G06V 20/47 |
| 2017/0068863 A1* | 3/2017 | Rattner | G06V 40/10 |
| 2019/0130191 A1 | 5/2019 | Zhou et al. | |
| 2019/0130580 A1* | 5/2019 | Chen | G06V 10/82 |
| 2019/0279032 A1 | 9/2019 | Tang et al. | |
| 2019/0378283 A1* | 12/2019 | Boult | G06N 20/00 |
| 2020/0012854 A1 | 1/2020 | Fu et al. | |
| 2020/0065632 A1 | 2/2020 | Guo et al. | |
| 2022/0027664 A1 | 1/2022 | Amin et al. | |
| 2023/0177796 A1* | 6/2023 | Cheng | G06V 10/751 |
| 2025/0109941 A1* | 4/2025 | Qiu | H01S 3/06795 |

FOREIGN PATENT DOCUMENTS

| | | | |
|---|---|---|---|
| CN | 108805064 | A | 11/2018 |
| CN | 109886998 | A | 6/2019 |
| CN | 109919008 | A | 6/2019 |
| CN | 109919009 | A | 6/2019 |
| CN | 110084829 | A | 8/2019 |
| CN | 111402298 | A | 7/2020 |
| CN | 111428567 | A | 7/2020 |
| EP | 2920960 | B1 | 7/2020 |
| KR | 102052110 | B1 | 12/2019 |

OTHER PUBLICATIONS

International Search Report in PCT/CN2021/113072 mailed on Nov. 3, 2021, 4 pages.
Written Opinion in PCT/CN2021/113072 mailed on Nov. 3, 2021, 4 pages.
First Office Action in Chinese Application No. 202010838479.1 mailed on Dec. 22, 2021, 11 pages.

* cited by examiner

200                                                          210 determining a target bounding box  from
an image frame in a video

220 determining a classification result of a
subject in the target bounding box by
processing the target bounding box using
a recognition model

230 determining one or more target image
frames to be saved in the video based on
the classification result

400

500

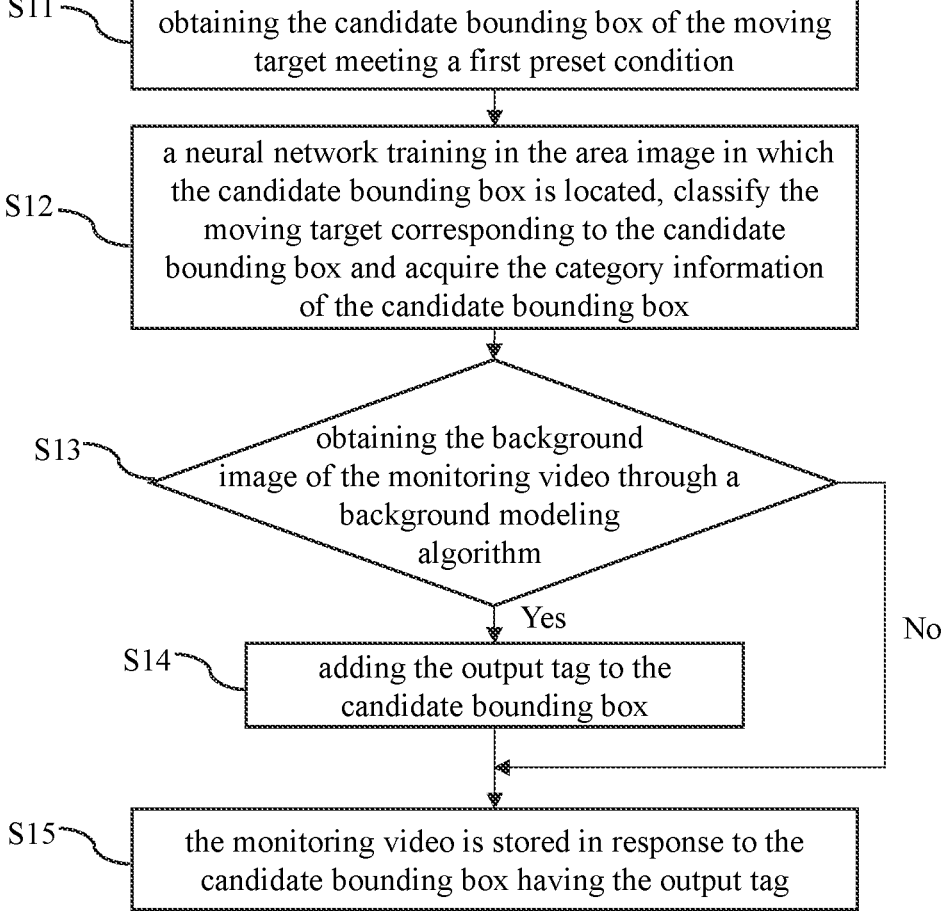

S11 — obtaining the candidate bounding box of the moving target meeting a first preset condition S12 — a neural network training in the area image in which the candidate bounding box is located, classify the moving target corresponding to the candidate bounding box and acquire the category information of the candidate bounding box S13 — obtaining the background image of the monitoring video through a background modeling algorithm Yes No S14 — adding the output tag to the candidate bounding box S15 — the monitoring video is stored in response to the candidate bounding box having the output tag

FIG. 6

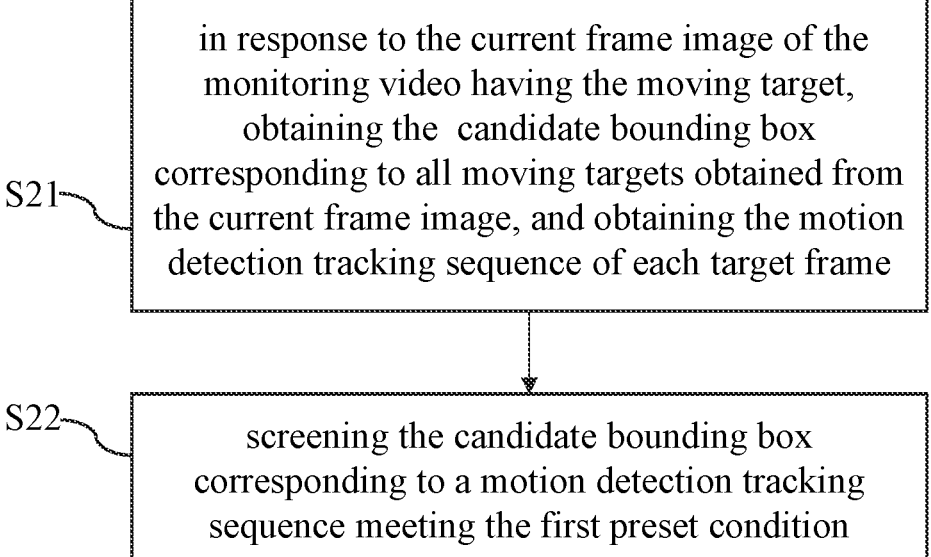

S21 in response to the current frame image of the
monitoring video having the moving target,
obtaining the candidate bounding box
corresponding to all moving targets obtained from
the current frame image, and obtaining the motion
detection tracking sequence of each target frame

S22 screening the candidate bounding box
corresponding to a motion detection tracking
sequence meeting the first preset condition

FIG. 7

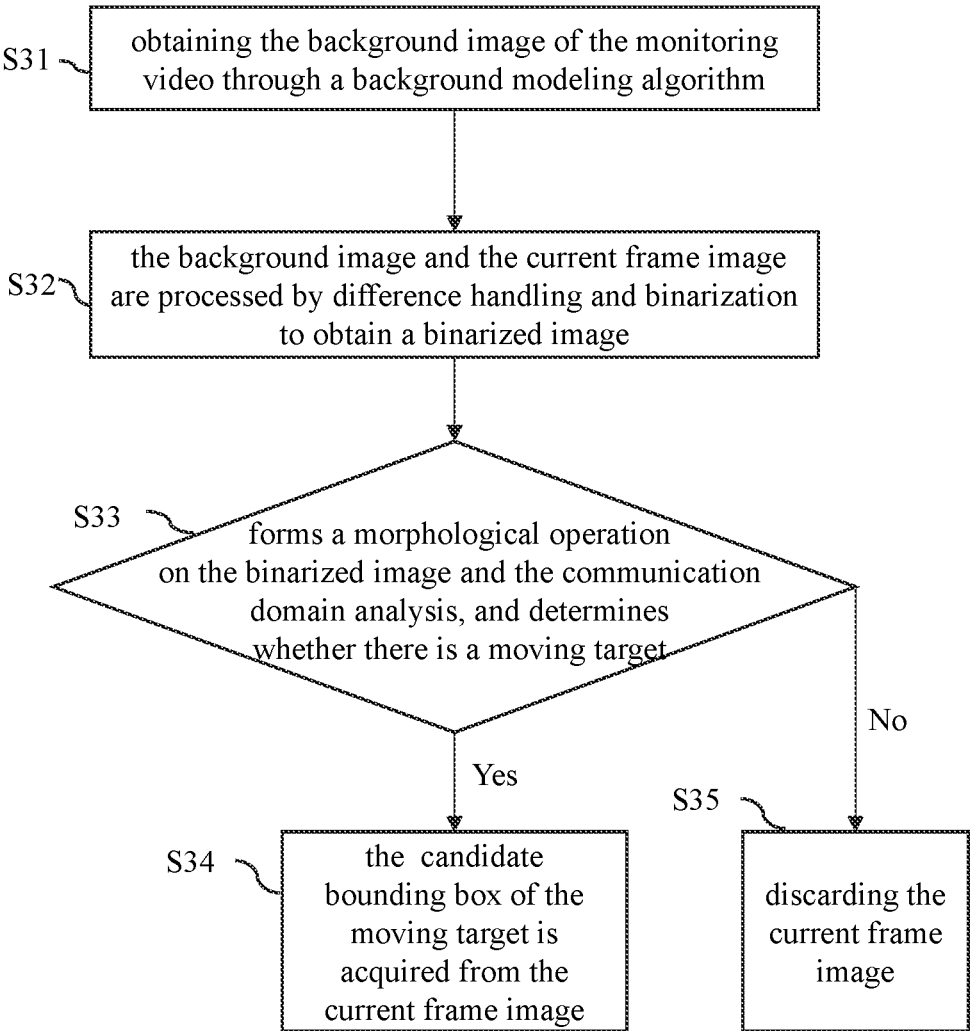

S31 — obtaining the background image of the monitoring video through a background modeling algorithm S32 — the background image and the current frame image are processed by difference handling and binarization to obtain a binarized image S33 — forms a morphological operation on the binarized image and the communication domain analysis, and determines whether there is a moving target Yes No S34 — the candidate bounding box of the moving target is acquired from the current frame image S35 — discarding the current frame image

FIG. 8

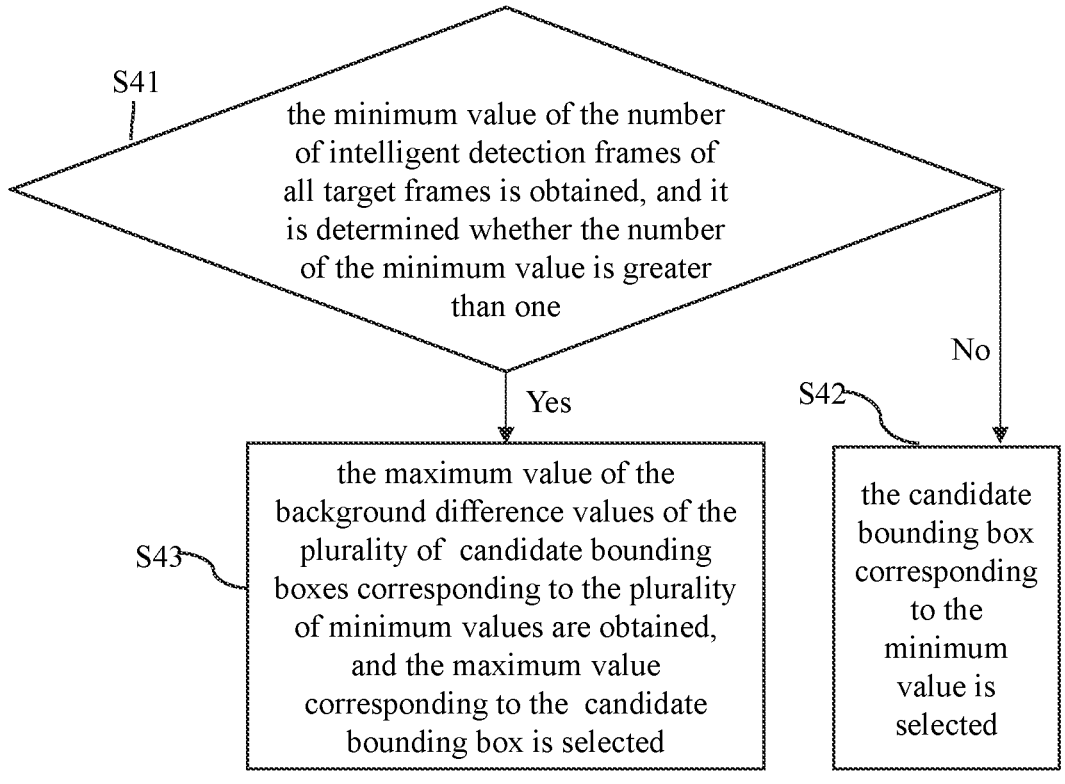

S41 the minimum value of the number of intelligent detection frames of all target frames is obtained, and it is determined whether the number of the minimum value is greater than one No Yes

S42

S43 the maximum value of the background difference values of the plurality of candidate bounding boxes corresponding to the plurality of minimum values are obtained, and the maximum value corresponding to the candidate bounding box is selected the candidate bounding box corresponding to the minimum value is selected

FIG. 9

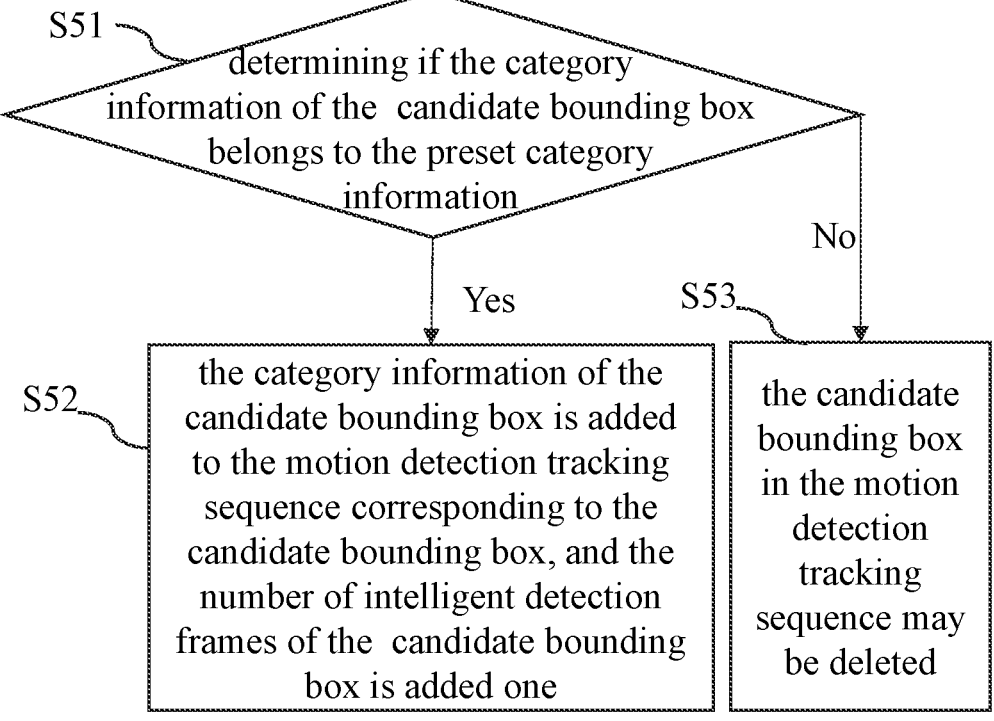

S51 determining if the category information of the candidate bounding box belongs to the preset category information No Yes        S53

S52 the category information of the candidate bounding box is added to the motion detection tracking sequence corresponding to the candidate bounding box, and the number of intelligent detection frames of the candidate bounding box is added one the candidate bounding box in the motion detection tracking sequence may be deleted

FIG. 10

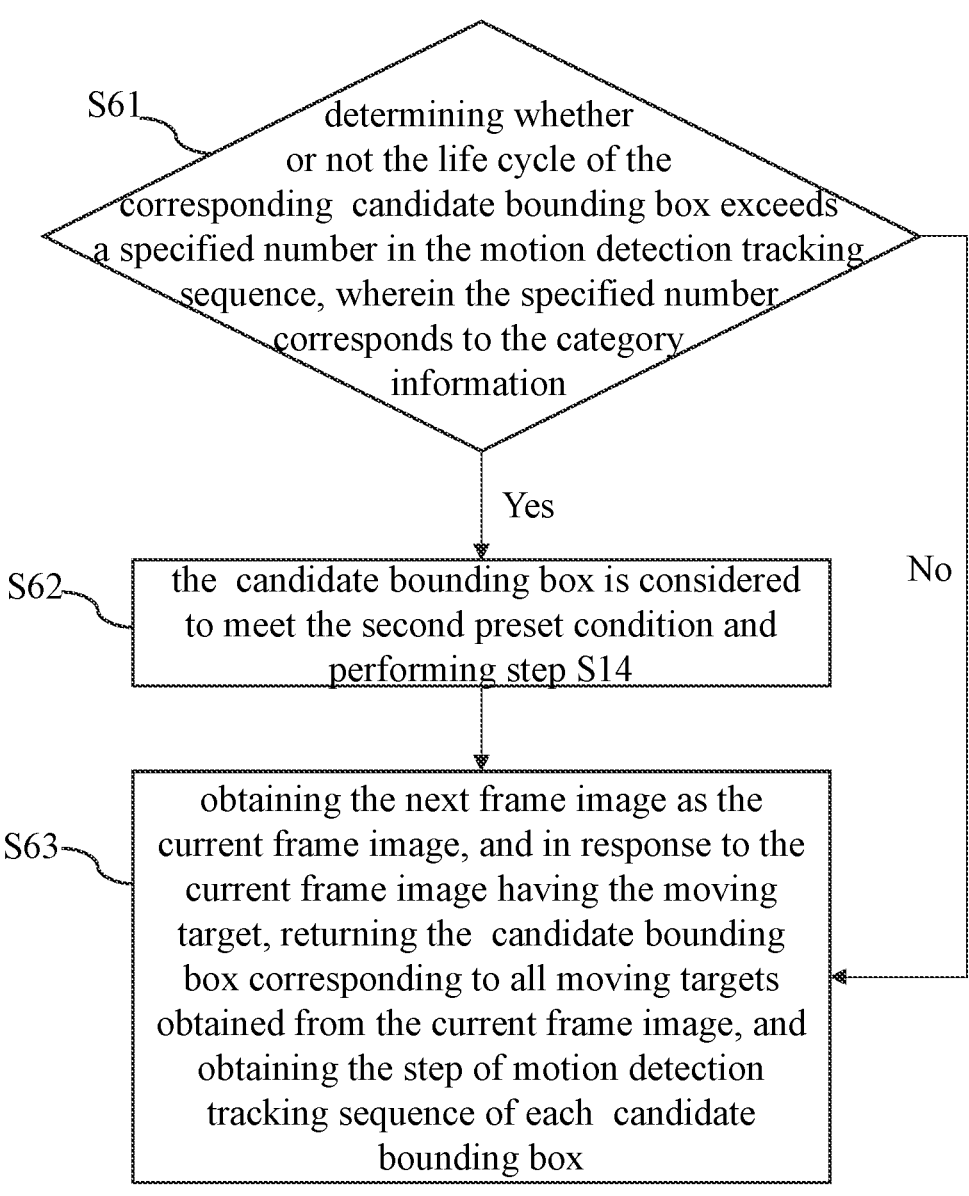

S61 — determining whether or not the life cycle of the corresponding candidate bounding box exceeds a specified number in the motion detection tracking sequence, wherein the specified number corresponds to the category information Yes No S62 — the candidate bounding box is considered to meet the second preset condition and performing step S14

S63 — obtaining the next frame image as the current frame image, and in response to the current frame image having the moving target, returning the candidate bounding box corresponding to all moving targets obtained from the current frame image, and obtaining the step of motion detection tracking sequence of each candidate bounding box

FIG. 11

S71   outputting all the candidate bounding boxes having output tag as the output result S72   determining whether the output result is an empty set No Yes S73   storing a video segment with a predetermined time length and a predetermined number of frames based on the output result S74   do not storing the monitoring video

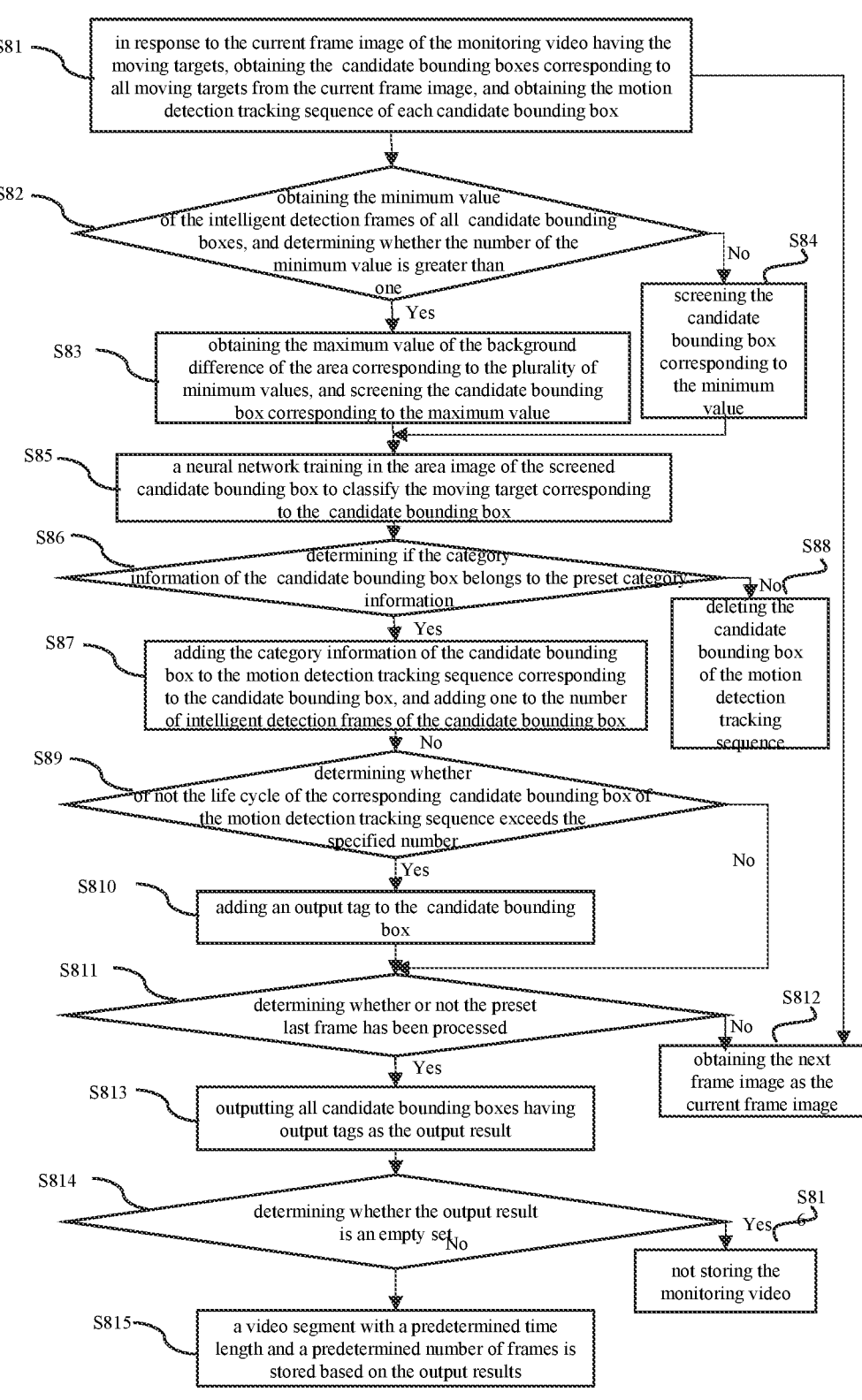

S81 — in response to the current frame image of the monitoring video having the moving targets, obtaining the candidate bounding boxes corresponding to all moving targets from the current frame image, and obtaining the motion detection tracking sequence of each candidate bounding box S82 — obtaining the minimum value of the intelligent detection frames of all candidate bounding boxes, and determining whether the number of the minimum value is greater than one No S84 — screening the candidate bounding box corresponding to the minimum value Yes S83 — obtaining the maximum value of the background difference of the area corresponding to the plurality of minimum values, and screening the candidate bounding box corresponding to the maximum value S85 — a neural network training in the area image of the screened candidate bounding box to classify the moving target corresponding to the candidate bounding box S86 — determining if the category information of the candidate bounding box belongs to the preset category information No S88 — deleting the candidate bounding box of the motion detection tracking sequence Yes S87 — adding the category information of the candidate bounding box to the motion detection tracking sequence corresponding to the candidate bounding box, and adding one to the number of intelligent detection frames of the candidate bounding box No S89 — determining whether or not the life cycle of the corresponding candidate bounding box of the motion detection tracking sequence exceeds the specified number Yes No S810 — adding an output tag to the candidate bounding box S811 — determining whether or not the preset last frame has been processed No S812 — obtaining the next frame image as the current frame image Yes S813 — outputting all candidate bounding boxes having output tags as the output result S814 — determining whether the output result is an empty set No Yes

S81 not storing the monitoring video

S815 — a video segment with a predetermined time length and a predetermined number of frames is stored based on the output results

METHODS AND SYSTEMS FOR VIDEO PROCESSING

CROSS-REFERENCE TO RELATED APPLICATION

This application is a continuation of International Application No. PCT/CN2021/113072, filed on Aug. 17, 2021, which claims priority to Chinese Patent Application No. 202010838479.1, filed on Aug. 19, 2020, the contents of each of which are hereby incorporated by reference.

TECHNICAL FIELD

The present disclosure relates to the field of data processing, and in particular to a method and a system for video processing.

BACKGROUND

At present, video surveillance has been widely used in various occasions. Through the analysis and storage of surveillance videos, the relevant surveillance videos may be traced and retrieved in time in the event of problems arising. However, due to the huge size of surveillance video data, a very large storage space is required whether the video data is stored locally or uploaded to the server. Moreover, there may be a large number of useless frames in these surveillance videos, for example, there are image frames without moving objects, and it is a waste of storage space to save them.

Therefore, there is a need for a video processing method and system that may store useful videos without wasting storage space.

SUMMARY

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

One aspect of embodiments of the present disclosure may provide a method and a system for video processing. The method for video processing may include determining a target bounding box from an image frame in a video; determining a classification result of a subject in the target bounding box by processing the target bounding box using a recognition model; and determining one or more target image frames to be saved in the video based on the classification result.

In some embodiments, the determining the target bounding box from the image frame in the video may include obtaining at least one candidate bounding box from the image frame; and determining the target bounding box by screening the at least one candidate bounding box based on a first condition.

In some embodiments, for one of the at least one candidate bounding box, the first condition may be related to a count of times that at least one associated bounding box corresponding to the candidate bounding box from at least one historical image frame in the video is processed by the recognition model.

In some embodiments, the first condition may be related to a difference between pixel-values of an area image and a background image in the candidate bounding box.

In some embodiments, for one of the at least one candidate bounding box, the first condition may be related to a historical confidence level, the historical confidence level is determined based on a recognition result of at least one associated bounding box corresponding to the candidate bounding box from at least one historical frame image in the video using the recognition model.

In some embodiments, the obtaining the at least one candidate bounding box from the image frame may include obtaining a background image of the image frame; determining a foreground image of the image frame based on the background image and the image frame; determining the at least one candidate bounding box based on the foreground image.

In some embodiments, the obtaining the background image of the image frame may include determining the background image by processing the video using a Gaussian background modeling algorithm.

In some embodiments, the determining the one or more target image frames to be saved in the video based on the classification result may include: determining the one or more target image frames to be saved based on the image frame corresponding to determining that the classification result of the subject includes a specific type, and that the target bounding box satisfies a second condition.

In some embodiments, the second condition may be related to a count of occurrences of the target bounding box and at least one associated bounding box corresponding to the target bounding box in the video.

In some embodiments, the method may further include determining a recognition bounding box by processing the target bounding box using the recognition model, and the recognition bounding box may be configured to mark the subject in the target bounding box.

Another aspect of embodiments of the present disclosure may provide a system for video processing. The system for video processing may include: at least one storage device including a set of instructions; and at least one processor configured to communicate with the at least one storage device. When executing the set of instructions, the at least one processor may be configured to direct the system to perform operations including: determining a target bounding box from an image frame in a video; determining a classification result of a subject in the target bounding box by processing the target bounding box using a recognition model; and determining one or more target image frames to be saved in the video based on the classification result.

In some embodiments, the determining the target bounding box from the frame image in the video may include obtaining at least one candidate bounding box from the image frame; and determining the target bounding box by screening the at least one candidate bounding box based on a first condition.

In some embodiments, for one of the at least one candidate bounding box, the first condition may be related to a count of times that at least one associated bounding box corresponding to the candidate bounding box from at least one historical image frame in the video is processed by the recognition model.

In some embodiments, the first condition may be related to a difference between pixel-values of an area image and a background image in the candidate bounding box.

In some embodiments, for one of the at least one candidate bounding box, the first condition may be related to a historical confidence level, the historical confidence level is determined based on a recognition result of at least one associated bounding box corresponding to the candidate bounding box from at least one historical frame image in the video using the recognition model.

In some embodiments, the obtaining the at least one candidate bounding box from the image frame may include obtaining a background image of the image frame; determining a foreground image of the image frame based on the background image and the image frame; determining the at least one candidate bounding box based on the foreground image.

In some embodiments, the obtaining the background image of the image frame may include determining the background image by processing the video using a Gaussian background modeling algorithm.

In some embodiments, the determining the one or more target image frames to be saved in the video based on the classification result may include determining the one or more target image frames to be saved based on the image frame corresponding to determining that the classification result of the subject includes a specific type, and that the target bounding box satisfies a second condition.

In some embodiments, the second condition may be related to a count of occurrences of the target bounding box and at least one associated bounding box corresponding to the target bounding box in the video.

In some embodiment, the system may further include determining a recognition bounding box by processing the target bounding box using the recognition model, and the recognition bounding box may be configured to mark the subject in the target bounding box.

Another aspect of embodiments of the present disclosure may provide a system for video processing. The system for video processing may include: a determining module configured to determine a target bounding box from an image frame in a video; a classifying module configured to determine a classification result of a subject in the target bounding box by processing the target bounding box using a recognition model; and a storage module configured to determine one or more target image frames to be saved in the video based on the classification result.

Another aspect of embodiments of the present disclosure may provide a non-transitory computer readable medium including executable instructions. When executed by at least one processor, the executable instructions may direct the at least one processor to perform a method. The method may include: determining a target bounding box from an image frame in a video; determining a classification result of a subject in the target bounding box by processing the target bounding box using a recognition model; and determining one or more target image frames to be saved in the video based on the classification result.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 6 is a flowchart illustrating an exemplary process for processing monitoring video according to some embodiments of the present disclosure;

FIG. 7 is a flowchart illustrating an exemplary embodiment of operation S11 in FIG. 6 according to some embodiments of the present disclosure;

FIG. 8 is a flowchart illustrating an exemplary embodiment of operation S21 in FIG. 7 according to some embodiments of the present disclosure;

FIG. 9 is a flowchart illustrating an exemplary embodiment of operation S22 in FIG. 7 according to some embodiments of the present disclosure;

FIG. 10 is a flowchart illustrating an exemplary embodiment of operations after operation S12 in FIG. 6 according to some embodiments of the present disclosure;

FIG. 11 is a flowchart illustrating an exemplary embodiment of operation S13 in FIG. 6 according to some embodiments of the present disclosure;

FIG. 13 is a flowchart illustrating another exemplary process for processing monitoring video according to some embodiments of the present disclosure;

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

The flowcharts used in the present disclosure illustrate operations that systems implement according to some embodiments of the present disclosure. It is to be expressly understood the operations of the flowcharts may be implemented not in order. Conversely, the operations may be implemented in an inverted order, or simultaneously. Moreover, one or more other operations may be added to the flowcharts. One or more operations may be removed from the flowcharts.

Figure 1:
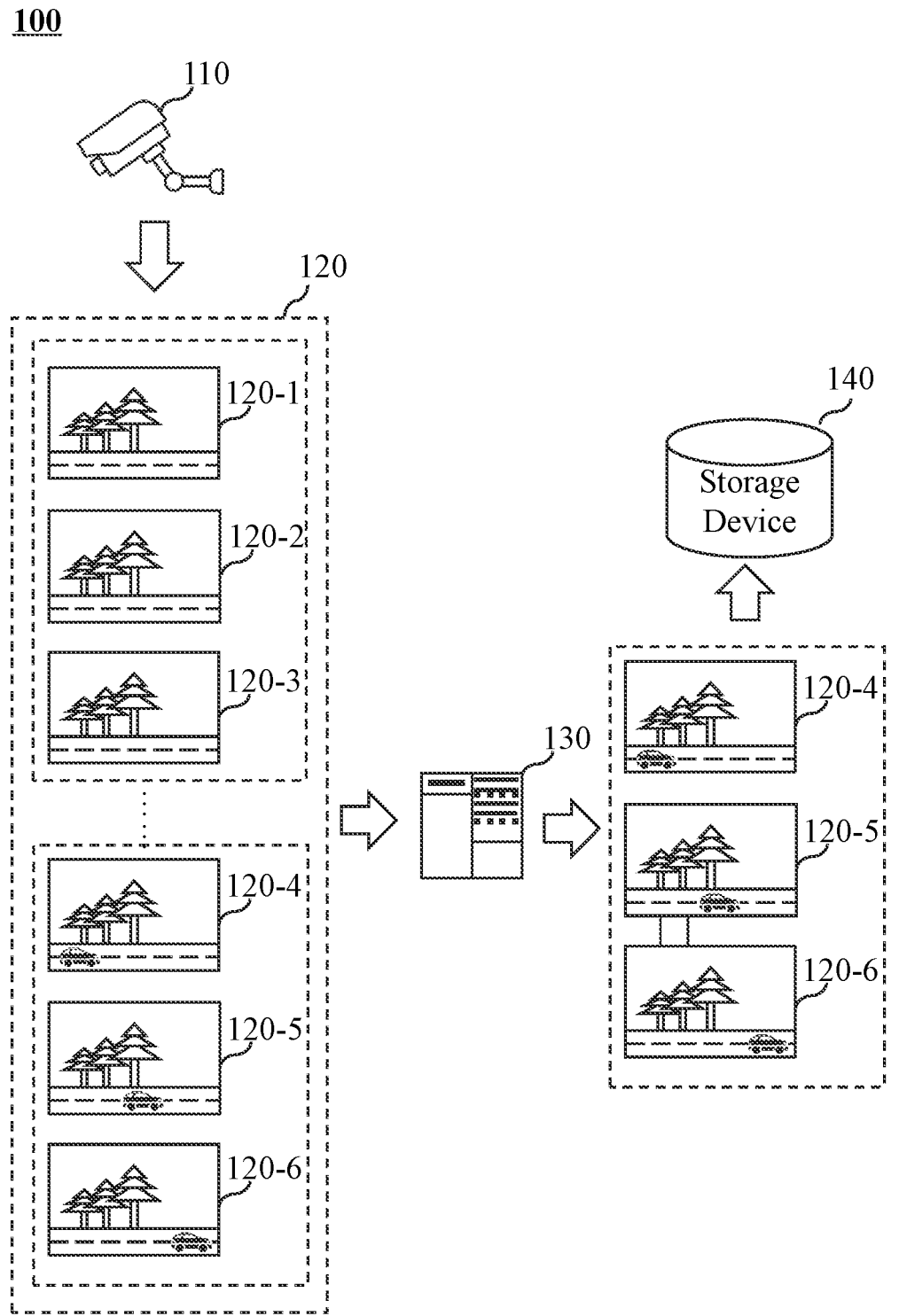
FIG. 1 is a schematic diagram illustrating an exemplary video processing system according to some embodiments of the present disclosure.

FIG. 1 is a schematic diagram illustrating an exemplary video processing system according to some embodiments of the present disclosure.

As shown in FIG. 1, the video processing system may include a camera 110, a processing device 130, and a storage device 140.

The camera 110 may be any electronic device capable of capturing image frames and/or videos. For example, the camera 110 may include an image sensor, a video recorder, etc., or any combination thereof. In some embodiments, the camera 110 may include any suitable type of camera, for example, a fixed camera, a fixed dome camera, etc., or any combination thereof.

In some embodiments, the camera 110 may obtain a video 120. The video 120 may contain multiple image frames, such as image frames 120-1, 120-2 . . . 120-6, etc. The image frames in the video 120 may include moving targets. For example, image frames 120-4, 120-5, and 120-6 include a moving object, e.g., a car.

The processing device 130 may process data and/or information obtained from the camera 110 and/or the storage device 140. In some embodiments, the processing device 130 may obtain the video 120 from the camera 110 via a network and process an image (also referred to as an image frame) in the video 120 to determine whether a moving target that satisfies certain conditions is represented in the image. If there is a moving target that satisfies the certain conditions, the processing device 130 may determine a target image (also referred to as a target image frame) to be stored according to the image. For example, the processing device 130 may process the image frame 120-1 in the video 120 and determine that the image frame 120-1 does not include a moving target that satisfies certain conditions, the processing device 130 may determine not to save the image frame 120-1 and not to identify other image frames to be saved based on the image frame 120-1. As another example, the processing device 130 may process the image frame 120-4 in the video 120 and determine that the image frame 120-4 includes a moving target (i.e. a car) that satisfies certain conditions, and the processing device 130 may determine the image frame 120-4 and two image frames after the image frame 120-4 (i.e., image frames 120-4, 120-5, and 120-6) are to be saved and transmit them to the storage device 140 to save via the network. In some embodiments, the image frames to be saved may also include other image frames, such as but not limited to several frames before or after the appearance of the moving object.

In some embodiments, the processing device 130 may include a central processing unit (CPU), a digital signal processor (DSP), etc., and/or any combination thereof. In some embodiments, the processing device 130 may be local, remote, or implemented on a cloud platform. In some embodiments, the processing device 130 or a part of the processing device 130 may be integrated into the camera 110.

The storage device 140 may store data, instructions, and/or any other information. In some embodiments, the storage device 140 may store data obtained from the camera 110 and/or the processing device 130 through a network. In some embodiments, the storage device 140 may obtain and store image frames to be saved from the processing device 130 through a network. For example, the storage device 140 may obtain and store image frames 120-4, 120-5, and 120-6 from the processing device 130.

In some embodiments, the processing device 130 may include a determining module, a classifying module, a storage module, and a training module.

The determining module may be configured to determine a target bounding box. In some embodiments, the determining module may obtain at least one candidate bounding box from an image frame of a video, and determine the target bounding box by screening the at least one candidate bounding box based on a first condition. The determining module may determine the at least one candidate bounding box in the image frame in a variety of ways. For example, the determining module may obtain a background image of the image frame, determine a foreground image of the image frame based on the background image, and further determine the at least one candidate bounding box based on the foreground image.

The classifying module may be configured to determine a classification result of a subject in the target bounding box. In some embodiments, the classifying module may be configured to determine the classification result of the subject in the target bounding box by processing the target bounding box using a recognition model. In some embodiments, the recognition model may output a recognition bounding box configured to mark the subject in the target bounding box.

The storage module may be configured to determine the image frames to be saved. In some embodiments, the storage module may determine whether to save the image frame including the target bounding box or to identify the image frames to be saved according to the image frame based on a determination that the classification result of the subject includes a specific type. In some embodiments, the storage module may determine whether to save the image frame including the target bounding box or to identify the image frames to be saved according to the image frame based on a determination that the target bounding box satisfies a second condition. In some embodiments, the storage module may determine whether to save the image frame including the target bounding box or to identify the image frames to be saved according to the image frame based on a combination of the classification result and the second condition.

The training module may be configured to obtain the recognition model through training. In some embodiments, the training module may train an initial recognition model with a large number of sample area images and their corresponding labels to obtain the recognition model.

It should be noted that the above description is merely provided for the purposes of illustration, and not intended to limit the scope of the present disclosure. For persons having ordinary skills in the art, multiple variations and modifications may be made under the teachings of the present disclosure. In some embodiments, the determining module, the classifying module, the storage module, and the training module disclosed in FIG. 1 may be different modules in one system, or one module may implement the functions of two or more modules mentioned above. For example, each module may share a storage module, and each module may also have its own storage module. However, those variations and modifications do not depart from the scope of the present disclosure.

Figure 2:
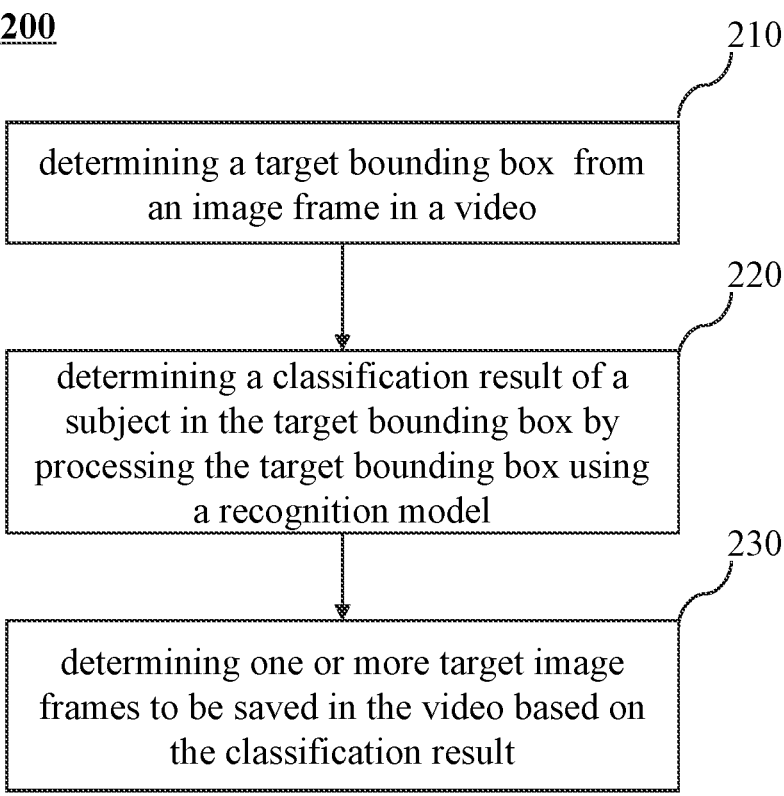
FIG. 2 is a flowchart illustrating an exemplary process for video processing according to some embodiments of the present disclosure.

FIG. 2 is a flowchart illustrating an exemplary process for video processing according to some embodiments of the present disclosure. As shown in FIG. 2, process 200 may include the following operations. In some embodiments, the process 200 may be performed by a processing device (e.g., a processing device 130).

In 210, the processing device (e.g., a determining module) may determine a target bounding box from an image frame in a video.

The target bounding box may refer to an area in the image frame ready for recognition processing. The target bounding box may be a rectangle or other shapes. An image frame may contain one or more target bounding boxes. An image frame may also contain no target bounding box, in which case subsequent operations (e.g., operation 220 and operation 230) may be skipped.

In some embodiments, the determining module may determine the target bounding box with a machine learning model for rough recognition. The machine learning model for rough recognition may refer to a machine learning model having a low recognition accuracy of a subject and a high execution efficiency.

In some embodiments, the determining module may determine the target bounding box according to operations for determining a candidate bounding box as described elsewhere in the present disclosure.

The determining module may also determine the target bounding box using other techniques.

The determination of the candidate bounding box may include obtaining at least one candidate bounding box from the image frame, and determining the target bounding box by screening the at least one candidate bounding box based on a first condition.

The candidate bounding box may refer to an area that may include a moving subject in the image frame. The candidate bounding box may be rectangle or other shapes. When determining the target bounding box based on the candidate bounding box, the determining module may perform a shape change or other image processing.

Figure 4:
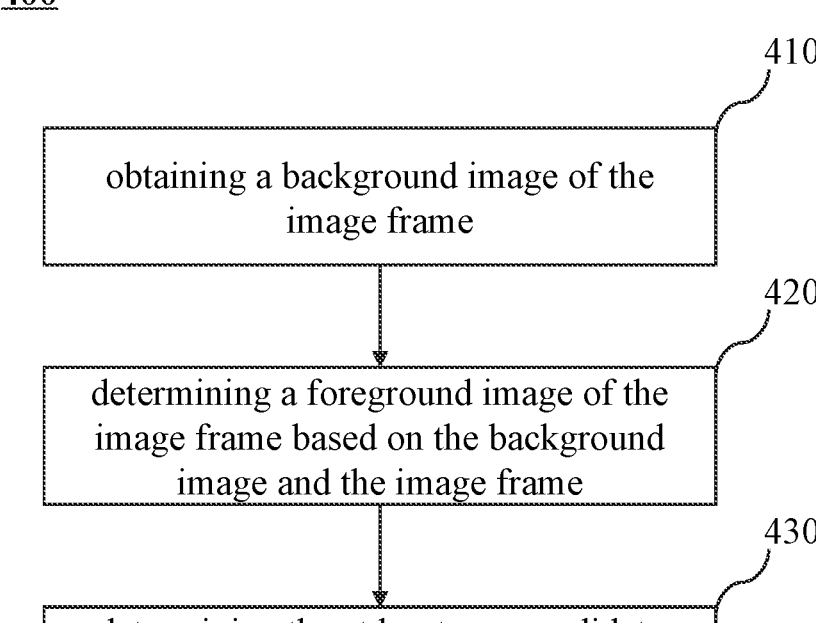
FIG. 4 is a flowchart illustrating an exemplary process for determining at least one candidate bounding box according to some embodiments of the present disclosure.

In some embodiments, the determining module may obtain at least one candidate bounding box from the image frame according to the process disclosed in FIG. 4.

In some embodiments, an image frame may not include a candidate bounding box, and the determining module may skip this image frame.

In some embodiments, the determining module may use other modules including a predetermined algorithm to obtain the candidate bounding box.

In some embodiments, the determining module may use a machine learning model for rough recognition similar to the above-mentioned to determine the candidate bounding box, and set a candidate bounding box determined by the machine learning model with a confidence level satisfying specific conditions as the target bounding box.

In some embodiments, the determining module may determine the candidate bounding box in a specific area by recognition machine learning model for rough recognition. The specific area may be determined based on the position of the candidate bounding box in a previous image frame. For instance, the specific area may be located near this position of the candidate bounding box in the previous image frame. The specific area may also be an expected position of a moving subject determined by the position of the moving subject in the previous image frame. For instance, the specific area may be where a road potentially leads to.

The determining module may obtain the candidate bounding box using other techniques (e.g., an image segmentation technique).

The first condition may be used to determine the target bounding box from the at least one candidate bounding box.

Figure 3:
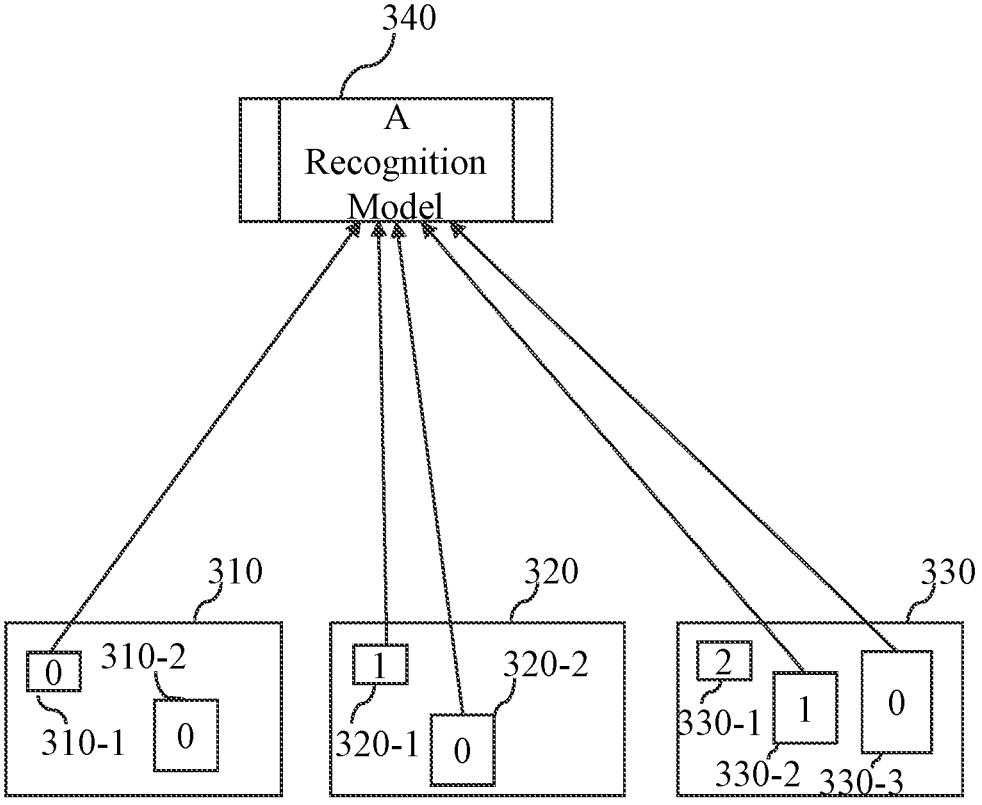
FIG. 3 is a schematic diagram illustrating an exemplary process for determining a count of times of processing the candidate bounding box according to some embodiments of the present disclosure.

In some embodiments, the first condition is related to a count of times of processing the candidate bounding box described in FIG. 3.

In some embodiments, the first condition may be that a confidence level (e.g., a confidence level determined by the machine learning model for rough recognition) of the candidate bounding box meets a specific condition (e.g., being greater than a certain threshold).

In some embodiments, the first condition may include other conditions.

Screening the candidate bounding box based on certain conditions may significantly reduce the count of image areas that need to be classified, thereby reducing the amount of calculation.

In 220, the processing device (e.g., a classifying module) may determine a classification result of a subject in the target bounding box by processing the target bounding box using a recognition model.

The recognition model may refer to a processing module that is configured to recognize whether the target bounding box includes a moving subject.

In some embodiments, the recognition model may be a machine learning model. For example, the recognition model may be a convolutional neural network (CNN) model, or other models that may perform a subject recognition function.

The input of the recognition model may include an image block. The image block may be a portion of the image frame in the target bounding box, or a processed portion of the image frame obtained by performing additional image processing operations on the portion of the image frame in the target bounding box.

In some embodiments, the input of the recognition model may include information such as a recognition result of the candidate bounding box corresponding to the target bounding box in other image frames, the confidence level of the recognition result of the candidate bounding box, the position relationship of the candidate bounding boxes between different image frames, or the like. Inputting more features may be beneficial to the recognition model in recognizing subjects more efficiently. For example, the possibility of the subject being a pedestrian may be relatively low if the moving speed of the subject determined from different image frames is too fast.

In some embodiments, the output of the recognition model may include the classification result of the subject in the target bounding box. For example, the classification result may be that the subject is a car, or the classification result may be that "the subject is unrecognizable".

In 230, the processing device (e.g., a storage module) may determine one or more target image frames to be saved in the video based on the classification result.

The purpose of the classification of the subject may be to selectively save the images (e.g., save a video segment including a moving subject, and not save a video segment only including a still subject).

In some embodiments, if in an image frame, the classification result of a subject in the target bounding box includes a moving subject, the storage module may save the image frame.

In some embodiments, the storage module may determine the target image frames to be saved according to following operations based on a second condition.

In some embodiments, the storage module may determine the target image frame to be saved using other techniques.

In some embodiments, the storage module may determine the target image frames to be saved based on the image frame in response to determining that the classification result of the subject includes a specific type, and the target bounding box satisfies a second condition.

The specific type may refer to preset types of moving subjects, such as cars, pedestrians, or the like.

In some embodiments, the specific type may be a specific type to be monitored, such as large trucks.

In an image frame, when there is a target bounding box including a specific type, further determinations may be made on the target bounding box according to the second condition.

The second condition may refer to other conditions associated with the target bounding box other than the condition of being the specific type.

In some embodiments, the second condition may include a condition associated with the size of the target bounding box. For example, the second condition may be that the size of the target bounding box is greater than a preset size.

In some embodiments, the second condition may be associated with a count of occurrences of the target bounding box and at least one associated bounding box corresponding to the target bounding box as discussed below.

The second condition may be flexibly combined with the classification results. For example, a target image frame may be determined to be saved when the size of the target bounding box is greater than a first preset size and the specific type is a pedestrian. For another example, a target image frame may be determined to be saved when the size of the target bounding box is greater than a second preset size and the specific type is a car.

In some embodiments, the second condition may include other conditions.

The application of the second condition may be flexibly combined with the recognition process of operation 220. For example, the second condition may be applied first, and the target bounding box that does not satisfy the second condition may be skipped in the recognition process in operation 220.

When the classification result of the subject in the target bounding box includes a specific type and the target bounding box satisfies the second condition, the storage module may determine the target image frame to be saved based on the image frame. For example, the target image frame to be saved may include the image frame and a plurality of image frames before the target image frame in the video. For another example, the target image frame to be saved may include the image frame and a plurality of image frames after the target image frame in the video.

In some embodiments, the number of additional image frames to be saved may be preset.

In some embodiments, the storage module may determine the number of additional image frames to be saved according to the classification result. For example, the number of additional image frames to be saved of a car may be different from that of a pedestrian.

In some embodiments, the number of additional image frames to be saved may be associated with the moving speed of the moving subject of the classification result, and the moving speed may be obtained based on the difference of positions of the target bounding box between different image frames. For example, when the difference of the position is large, the processing device may determine a larger number of additional image frames to be saved.

In some embodiments, the storage module may determine the number of additional image frames to be saved according to the classification result and the count of occurrences of the target bounding box and the associated bounding boxes corresponding to the target bounding box. For example, the more times the target bounding box and its associated bounding boxes occur, and the slower moving speed the moving subject of the classification result has, the more additional image frames may be saved.

In some embodiments, the storage module may determine the number of additional image frames to be saved according to the remaining space of a storage device.

Determining the target image frames to be saved based on the second condition may make the saved images more accurate, thereby reducing the amount of stored data.

In some embodiments, the second condition may be related to a count of occurrences of the target bounding box and at least one associated bounding box corresponding to the target bounding box in the video. In the above-mentioned embodiments, the target bounding box may be determined based on the candidate bounding box, that is, the target bounding box may correspond to the candidate bounding box. The candidate bounding box appearing in a certain image frame in the video may represent that the target bounding box determined based on the candidate bounding box (i.e. the target bounding box corresponding to the candidate bounding box) appears in the frame image.

The processing device may establish a corresponding relationship between the candidate bounding boxes in a plurality of frame images. For example, a corresponding relationship may be established between two candidate bounding boxes of two adjacent image frames based on distance of the candidate bounding boxes. An associated bounding box corresponding to a candidate bounding box may refer to a bounding box having a corresponding relationship with the candidate bounding box, and being in another image frame than the image frame where the candidate bounding box is located. An associated bounding box corresponding to a target bounding box may refer to an associated bounding box corresponding to a candidate bounding box which is further corresponding to the target bounding box, that is, an associated bounding box corresponding to a candidate bounding box that was based on to determine the target bounding box. Thus, a target bounding box may correspond to a plurality of candidate bounding boxes in a plurality of image frames. More specifically, a target bounding box may correspond to the candidate bounding box that was based on to determine the target bounding box, as well as the associated bounding boxes corresponding to the candidate bounding box. The count of occurrences of the plurality of candidate bounding boxes may be used for the second condition. For example, the second condition may include a condition related to the count of occurrences of the target bounding box and the associated bounding box corresponding to the target bounding box. When the count of occurrences is greater than a threshold, the second condition may be satisfied. In some embodiments, when determining the corresponding relationship between candidate bounding boxes, or when calculating the times that a target bounding box and its associated bounding boxes occur, a frame skipping may be included. The frame skipping may refer to that some image frames may not include the image in the candidate bounding box and the associated bounding boxes corresponding to the candidate bounding box because of accidental causes (e.g., being temporarily blocked). For example, a video may contain 50 image frames, wherein a candidate bounding box is located at the $40^{th}$ image frame, and the associated bounding boxes corresponding to the candidate bounding box are located between the 10th image frame and $20^{th}$ image frame, and between the $24^{th}$ image frame and $39^{th}$ frames. A frame skipping occurs if the associated bounding boxes corresponding to the candidate bounding box disappears between the $20^{th}$ image frame and the $24^{th}$ image frame, caused by the background of the image frames blocking the moving subject of the candidate bounding box.

Using the count of occurrences of the plurality of candidate bounding boxes in the second condition may avoid some unnecessary image saving. For example, some subjects may only be interfering information rather than subjects that need to be observed in the video.

In some embodiments, the determining video frames to be saved by using a recognition model and classification results may more efficiently screen video frames that include a moving subject, therefore making the saved video frames more accurate and reducing unnecessary image saving.

It should be noted that the above-mentioned description of process 200 is for illustrative purposes only, and is not intended to limit the scope of the present disclosure. For those skilled in the art, without deviating from the principles of the present disclosure, various variations and modifications of the forms and the details of the above methods and systems may be made. However, these variations and modifications is also within the scope of the present disclosure. In some embodiments, one or more operations of process 200 may be omitted, and/or one or more additional operations may be added to process 200. For example, a storing operation may be added to process 200. In the storing operation, a processing device 130 may store information and/or data related to the system for video processing (e.g., the candidate bounding box) in the storage device (e.g., a storage device 140).

As described in FIG. 2, the first condition is related to the count of times of processing the candidate bounding box. The times of processing the candidate bounding box may refer to times that an associated bounding box corresponding to the candidate bounding box from at least one historical image frame in the video is processed by the recognition model. The at least one historical image frame may refer to another image frame located before the image frame which the candidate bounding box (e.g., the candidate bounding box as described in FIG. 2 and FIG. 3) appears in the video.

As described in FIG. 2, the processing device may establish a corresponding relationship between the candidate bounding boxes in a plurality of image frames. Multiple candidate bounding boxes with an established corresponding relationship may be considered to be the same candidate bounding box. The same candidate bounding box may be processed by the recognition model, and may also not be processed by the recognition model in different image frames. In other words, in light of the description of the associated bounding box corresponding to the candidate bounding box in disclosure related to FIG. 2, for a candidate bounding box of a certain image frame, its associated bounding boxes may be processed by the recognition model, or may not be processed by the recognition model.

For example, FIG. 3 is a schematic diagram illustrating an exemplary process for determining a count of times of processing the candidate bounding box according to some embodiments of the present disclosure. As shown in FIG. 3, the video may contain a plurality of image frames ranked in chronological order, i.e., image frames 310, 320, and 330. Image frame 310 includes candidate bounding boxes 310-1 and 310-2, image frame 320 includes candidate bounding boxes 320-1 and 320-2, and image frame 330 includes candidate bounding boxes 330-1, 330-2, and 330-3. The candidate bounding box 310-1 in image frame 310, the candidate bounding box 320-1 in image frame 320, and the candidate bounding box 330-1 in image frame 330 have a corresponding relationship with each other and may be considered as the same candidate bounding box, i.e., the associated bounding boxes corresponding to the candidate bounding box 310-1 include candidate bounding boxes 320-1 and 330-1. The candidate bounding box 310-2 in image frame 310, the candidate bounding box 320-2 in image frame 320, and the candidate bounding box 330-2 in image frame 330 have a corresponding relationship with each other and may be considered as the same candidate bounding box, i.e., the associated bounding boxes corresponding to the candidate bounding box 310-2 include candidate bounding boxes 320-2 and 330-2. Even though the candidate bounding box 310-1 in the image frame 310 may not be processed by a recognition module 340, the candidate bounding box 320-1 in image frame 320 after image frame 310 (that is, the associated bounding box corresponding to the candidate bounding box 310-1) is processed by the recognition module 340.

A processing device may record the count of times that the recognition model processes the associated bounding boxes corresponding to the candidate bounding box by a variety of ways. As shown in FIG. 3, the counting numbers 0, 1, 2 in FIG. 3 represent the count of times that the associated bounding boxes corresponding to the candidate bounding box are processed, obtained either before that candidate bounding box is inputted into the recognition model, or by the processing device when the processing device is processing that candidate bounding box. Image frames before image frame 310 may not include an associated bounding box corresponding to the candidate bounding box 310-2, or may include an associated bounding box but were not processed to recognize it. Thus, when the processing device processes candidate bounding box 310-2, the obtained count of times that associated bounding boxes corresponding to the candidate bounding box 310-2 are processed is 0. The candidate bounding box 310-2 in the image 310 is not processed by the recognition model 340, and therefore, when the processing device processes the candidate bounding box 320-2, the obtained count of times that associated bounding boxes corresponding to the candidate bounding box 320-2 are processed is 0. The candidate bounding box 320-2 in image 320 is processed by the recognition model 340, and therefore, when the processing device processes the candidate bounding box 330-2, the obtained count of times that associated bounding boxes corresponding to the candidate bounding box 330-2 are processed is 1.

The first condition may be associated with the count of times of processing described above. For example, the first condition may include a threshold of the count of times of processing. When the count of times of processing is smaller than the threshold, the first condition may be considered satisfied. That is, the recognition model may prioritize candidate bounding boxes that were less processed. For another example, the first condition may include formulas composed by the times of processing and other parameters.

Determining the target bounding box based on the times of processing may reduce redundant recognition processing and maintain accuracy of recognition.

In some embodiments, the threshold may be related to the size of the target bounding box, i.e. the target bounding boxes of different sizes use different thresholds. In some embodiments, the above-mentioned threshold may be associated with the position of the target bounding box. For example, if historically the count of times that different target bounding boxes in adjacent areas are processed is less, the processing device may set a higher threshold in these areas, that is, it may be considered that a moving subject is less likely to appear in these areas, and further judgement may be required.

In some embodiments, the first condition may be related to a difference between pixel-values of an area image and a background image in the candidate bounding box.

The description for the background image and the difference may be found in FIG. 4.

The candidate bounding box may determine an area image, and each pixel-value of the area image may have a difference with each pixel-value of the background image. These differences may be used in the first condition by a variety of ways. For example, the first condition may be related to a minimum value of the differences, an average value of the differences, or the like.

For example, the first condition may be that a difference is smaller than a preset threshold.

As another example, the first condition may be (times of processing<a1 and min(differences)<b1), or (time of processing<a2 and min(differences)>=b2), wherein a2<a1. That is, when the difference between area image in the candidate bounding box and the background image is not obvious enough, multiple times of processing may be needed.

In some embodiments, the first condition may be related to the differences in other ways.

Using the differences in the first condition may make it more flexible and more accurate to select the candidate bounding box.

In some embodiments, for a candidate bounding box, the first condition may be related to a historical confidence level of an associated bounding box corresponding to the candidate bounding box. The historical confidence level may be determined based on a recognition result of at least one associated bounding box corresponding to the candidate bounding box from at least one historical frame image in the video using the recognition model.

When the recognition model is processing the candidate bounding box or the associated bounding box corresponding to the candidate bounding box, a classified confidence level may be output.

As mentioned above, a candidate bounding box may correspond to at least one same candidate bounding box in at least one historical frame image, wherein the corresponding and same candidate bounding box in the historical frame image is an associated candidate bounding box corresponding to the candidate bounding box. When the associated bounding box corresponding to the candidate bounding box is being processed in the historical frame image, the corresponding confidence level may be obtained.

The first condition may be related to the confidence level. For example, the processing device may set the candidate bounding box as a target bounding box on the condition that the average value of the confidence levels of the associated bounding boxes corresponding to the candidate bounding box is smaller than a preset threshold. For another example, the first condition may include a combination of the confidence level and the times of processing.

Using the confidence level in the first condition may better control the amount of calculation required and improve the accuracy of recognition.

In some embodiments, the first condition may be related to a combination of the historical confidence level of the associated bounding box corresponding to the candidate bounding box, the times of processing the associated bounding box corresponding to the candidate bounding box, and/or the difference between pixel-values of the area image and the background image in the candidate bounding box. For example, the first condition may be that the count of times of processing is smaller than a threshold of count, and the difference between pixel-values of the area image and the background image is greater than a threshold of difference. For another example, the first condition may be that the count of times of processing is greater than a threshold of count, and the historical confidence level is greater than a threshold of confidence level.

FIG. 4 is a flowchart illustrating an exemplary process for determining at least one candidate bounding box according to some embodiments of the present disclosure. As shown in FIG. 4, process 400 may include the following operations. In some embodiments, the process 400 may be executed by a processing device (e.g., a processing device 130).

In 410, the processing device (e.g., a determining module) may obtain a background image of the image frame.

The background image may refer to an image including only the background portion of an image frame that is determined based on the image frame. As shown in FIG. 1, an image frame may include only the background image. For example, image frame 120-1 does not include a moving subject, and therefore the entire image frame is the background image. An image frame may also include a moving subject and the background image. For example, image frame 120-4 includes a moving subject, i.e. a car, and therefore the image of every other subjects except the car is the background image. A background may include a still subject, or a subject having a small range of movement, such as the shaking of leaves. The pixel-value of the background image may be the same as the original image frame, and may be a specific value to the non-background portion of the original image frame, such as 255, 65535, −1, or the like.

Obtaining the background image of the image frame may refer to obtaining an image of the corresponding background of an image frame. The determining module may determine the background image of an image frame based on other image frames.

In some embodiments, the determining module may obtain the background image in the frame image using an algorithm or a model. For example, the determining module may obtain the background image using a machine learning model. As another example, the determining module may obtain the background image using the inter-frame difference algorithm, Vibe algorithm, or the like.

In some embodiments, the determination module may determine the background image based on a Gaussian background modeling algorithm. When the Gaussian background modeling algorithm is applied, the determining module may process a plurality of image frames to obtain a distribution of pixel-values at an initial phase, and then process new image frames on a rolling basis based on the distribution of pixel-values to determine the background image.

Applying the Gaussian background modeling algorithm may help the processing of minor shakes of subjects so that mistakenly recognizing minor shakes as a moving subject may be avoided, thereby obtaining background images with high quality.

In some embodiments, the determining module may determine the background image using different algorithms. Different algorithms of determining background images may be applied to different areas. The determining module may determine a division of areas and a corresponding algorithm to each area based on statistical information of the historical background image processing. For example, some regions may have fixed backgrounds, and therefore the inter-frame difference algorithm may be applied; other regions may have more shakes, and therefore the Gaussian background modeling algorithm may be applied. Thus, accuracy and efficiency may further be improved in background determination.

In some embodiments, the determining module may also obtain the background image using other techniques.

In 420, the processing device (e.g., a determining module) may determine a foreground image of the image frame based on the background image and the image frame.

The determining module may obtain a potential foreground image based on a difference between the background image and the image frame. The potential foreground image may be used as the foreground image directly, or may be used as the foreground image after being processed. The processing may include denoising, morphological operations, or the like.

In 430, the processing device (e.g., a determining module) may determine the at least one candidate bounding box based on the foreground image.

The determining module may divide the foreground images into unconnected portions and determine a candidate bounding box for each portion accordingly, based on a determination of whether foreground images are of connected parts. For example, a head and a body of a person are connected, and therefore one candidate bounding box may be determined accordingly. As another example, two balloons are separated, and therefore two candidate bounding boxes may be determined accordingly.

In some embodiments, the candidate bounding box may be determined using other operations.

Determining the candidate bounding box based on the background image and the foreground image using methods disclosed in above-mentioned embodiments may make determining the candidate bounding box more effective.

Figure 5:
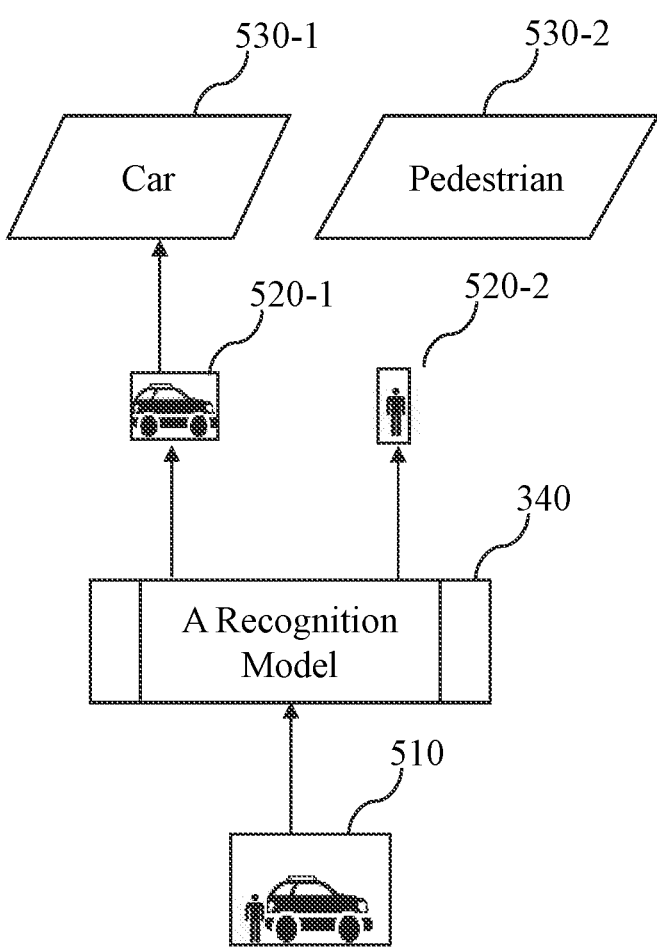
FIG. 5 is a schematic diagram illustrating an exemplary recognition model according to some embodiments of the present disclosure.

FIG. 5 is a schematic diagram illustrating an exemplary recognition model according to some embodiments of the present disclosure.

In some embodiments, besides outputting the classification result, the recognition model may output one or more recognition bounding boxes. The recognition bounding boxes may mark the one or more subjects that are processed.

For example, the recognition model 340 may output recognition bounding box 520-1 marking a car and recognition bounding box 520-2 marking a pedestrian from target bounding box 510 of FIG. 5. Because recognition bounding box 520-1 and the recognition bounding box 520-2 may be connected, they may be included in the same candidate bounding box in previous processing.

In some embodiments, parameters of the recognition model may be obtained by training. A training module may train, based on training samples, an initial recognition model to obtain the recognition model. The training samples may include a plurality of sample area images, and a sample area image may include moving subjects or may not include moving subjects. The sample area image may include one or more moving subjects. When the output of the recognition model includes a classification result, the label of a training sample may correspond to the specific type of the moving subject of the sample area image, and the label may be "the subject is unrecognizable" if the sample area image does not include a corresponding specific type of moving subject. When the output of the recognition model r includes a recognition bounding box, the label of the training sample may include the recognition bounding box corresponding to each moving subject in the sample area image. For example, the training module may obtain the recognition bounding box corresponding to each moving subject in the sample area image using a masking technique.

Marking the subject that is processed may be beneficial for further determining a storage plan of the image frames. For example, the size of the recognition bounding box and the classification result corresponding to the subject may affect the decision of whether the image frame needs to be stored.

In some embodiments, when the recognition bounding box is smaller than a preset value, the number of additional image frames to be saved may be reduced.

In some embodiments, the determining module may update the background image based on the recognition result.

In some embodiments, according to the recognition result of the target bounding box and the positions of candidate bounding boxes corresponding to the target bounding box in different image frames, the determining module may determine that the subject in the target bounding box is still.

In some embodiments, according to the above determination that the subject in the target bounding box is still, the determining module may stop screening and processing later candidate bounding boxes corresponding to the target bounding box, thereby reducing the amount of calculation.

In some embodiments, according to the above determination that the subject in the target bounding box is still, the determining module may set the corresponding area image of the target bounding box as a part of the background image. The speed of updating the background image according to this approach may be faster than the speed of updating the background image based on the image frame itself, thereby reducing the processing of the candidate bounding box and the target bounding box.

The above-mentioned embodiments may be better understood in an example as below. A video may include a car, and the car may stop after driving for a period of time. When the target bounding box corresponding to the car is processed, since the positions of candidate bounding boxes corresponding to the target bounding box in different image frames are not changed in the still stage of the car, the determining module may determine that the car is still. In the following processing, if the position of the corresponding candidate bounding box is not changed, the candidate bounding box may cease to be processed. The area image of the car may also be treated as a part of the background image, until the car is moving again to alter the background image.

In some embodiments, the video may include a monitoring video below. Subjects may include moving subjects (e.g., pedestrians, vehicles, or the like) and non-moving subjects (e.g., trees, houses, or the like). The target bounding box may include a candidate bounding box corresponding to the motion detection tracking sequence and satisfying the first condition below. The count of times of processing the candidate bounding box may include the number of frames by intelligent detection of the candidate bounding box below. The difference between pixel-values of the area image and the background image in the candidate bounding box may include the background difference of area where the candidate bounding box is located below. The classification result may include the category information below. The count of occurrences of the target bounding box and the at least one associated bounding box corresponding to the target bounding box in the video may cover the life cycle of the target bounding box below. Because the target bounding box may be obtained based on the candidate bounding box, the count of occurrences of the target bounding box and the at least one associated bounding box corresponding to the target bounding box may also cover the life cycle of the candidate bounding box corresponding to the target bounding box.

Monitoring video may consist of a plurality of frames of images. Some image frames may have no moving target, and some image frames may have one or more moving targets. Some of the moving targets may be real moving targets, and some may be false moving targets, such as lights or leaves. If only storing the image frames containing the moving target directly as a video segment by the prior art, it may cause the problem of wasting storage space. In order to solve this problem, the present disclosure provides the following technical solutions.

As shown in FIG. 6, which is a flowchart illustrating an exemplary process for processing monitoring video according to some embodiments of the present disclosure, the process may include the following operations:

In S11, obtaining the candidate bounding box of the moving target meeting a first preset condition.

Monitoring video may consist of a plurality of frames of images. The operation object of this embodiment is a single frame of the image. The image frame being processed obtained from the monitoring video is defined as the current frame image. After it is determined that the current frame image having a moving target (which may be a real moving target or a false moving target) through the methods in the prior art, obtaining a candidate bounding box of a moving target meeting the first preset condition. That is, the present embodiment may screen out the candidate bounding box that is more likely to be a real moving target for further judgment.

In some embodiments, as shown in FIG. 7, which is a flowchart illustrating an exemplary embodiment of operation S11 in FIG. 6 according to some embodiments of the present disclosure, that is, the candidate bounding box of the moving target meeting the first preset condition of the monitoring video may be obtained by the following operations:

In S21, in response to the current frame image of the monitoring video having the moving target, obtaining the candidate bounding box corresponding to all moving targets obtained from the current frame image, and obtaining the motion detection tracking sequence of each target frame.

First, after determining the current frame image having the moving target (one or more) through the method in the prior art, the target frames corresponding to all moving targets are obtained from the current frame image. In some embodiments, as shown in FIG. 8, which is a flowchart illustrating an exemplary embodiment of operation S21 in FIG. 7 according to some embodiments of the present disclosure, that is, in response to the current frame image of the monitoring video having the moving target, the operation of obtaining the target frame corresponding to all moving targets from the current frame image may include the following operations:

In S31, obtaining the background image of the monitoring video through a background modeling algorithm.

The monitoring camera corresponding to the monitoring video in this present disclosure is fixed, so the monitoring video has a fixed background image, this embodiment may perform a real-time Gaussian background modeling (also suitable for other background modeling algorithms, such as frame difference algorithm, Vibe algorithm) to the monitoring video, to obtain a stable background image.

In S32, the background image and the current frame image are processed by difference handling and binarization to obtain a binarized image.

After getting a stable background image, the background image and the current frame image are processed by difference handling and binarization, that is, obtaining an absolute value of the pixel difference between the current frame image and the background image, and performing binarization processing to obtain a binarized image.

In S33, forms a morphological operation on the binarized image and the communication domain analysis, and determines whether there is a moving target.

After obtaining the binarized image of the current frame image, a morphological operation such as corrosion expansion is performed on the binarized image, and the communication domain analysis is performed to determine whether there is a moving target in the current frame image.

In S34, if there is a moving target in the current frame image, the candidate bounding box of the moving target is acquired from the current frame image.

If there is a moving target in the current frame image, the candidate bounding box of the moving target is obtained from the current frame image, there may be one, or there may be a lot, which may be a real moving target, or it may be a false target.

In S35, if there is not a moving target in the current frame image, discarding the current frame image.

If there is no moving target in the current frame image, that is, the difference between the current frame image and the background image is small, and below the preset difference threshold, then the current frame image is discarded, that is, the current frame image is not stored.

The above operations S31-S35 are known in the prior art, and the present disclosure is not described in detail.

After the candidate bounding box of all moving targets in the current frame image is obtained by the above-described operations S31-S35, the motion detection tracking sequence of each candidate bounding box is obtained. That is, each motion detection tracking sequence corresponds to a candidate bounding box and a moving target. The associated matching algorithm, Kalman filtering algorithm or other algorithms may be used for tracking processing to obtain the corresponding motion detection tracking sequence.

Each motion detection tracking sequence includes the life cycle of the corresponding target frame, the number of intelligent detection frames and the background difference of the area where the corresponding target frame is located. The life cycle of the target frame includes the number of times the target frame appears in the surveillance video, which can be used as an auxiliary judgment standard to judge whether the moving target corresponding to the target frame is a real moving target. After obtaining the target frame from the current frame image for the first time, set its life cycle to the second initial value (for example, 1) in its corresponding motion detection and tracking sequence, and then add 1 to the corresponding life cycle in the motion detection and tracking sequence of the corresponding target frame every time the same target frame is acquired in other image frames. The number of intelligent detection frames of the target frame is used to indicate the parameters for subsequent neural network training. After the target frame is obtained from the current frame image for the first time, the number of intelligent detection frames is set to the first initial value in its corresponding motion detection tracking sequence, for example, 0. Other settings for the number of intelligent detection frames may be described below. The background difference of the target frame refers to the difference between the area where the target frame is located in the current frame image and the corresponding area in the background image. It may also be used as an auxiliary judgment standard to judge whether the moving target corresponding to the target frame is a real moving target.

Obtaining the motion detection tracking sequence of each moving target in the current frame image is to screen for all kinds of parameters in the motion detection tracking sequence and to determine the real moving target.

In S22, screening a candidate bounding box corresponding to a motion detection tracking sequence meeting the first preset condition.

After obtaining the motion detection tracking sequence of each moving target in the current frame image, the partial parameters in the motion detection tracking sequence are used as judgments, and screening out the candidate bounding box that is more likely to be a real moving target for performing neural network training, specific screening process would be described below.

In S12, a neural network training in the area image in which the candidate bounding box is located, classify the moving target corresponding to the candidate bounding box and acquire the category information of the candidate bounding box.

In the embodiment, a convolutional neural network is pre-trained, which may perform semantic segmentation on the input image and classify each pixel. After filtering the target frame meeting the first preset condition, the area image is cut out according to the coordinates of the target frame, and then input the convolution neural network to classify the moving targets corresponding to the target frame. In other words, what type of moving targets need to be stored from the monitoring video, the convolutional neural network that may classify this type of moving targets is trained to achieve accurate classification, to reduce the storage space occupied by the stored video segments. Moreover, because the convolutional neural network adopts the cut image, the input size may be between 64*64 to 256*256, which may reduce the number of layers of the network, control the time-consuming of the convolutional neural network, and improve the efficiency of moving target classification.

In S13, determining whether the candidate bounding box meets the second preset condition based on the category information.

After classifying the candidate bounding box by the convolutional neural network, it may be determined whether the candidate bounding box meets the second preset condition based on the category information, which is specifically screened according to the life cycle corresponding to the category information, and is further screened to the candidate bounding box. Thus, different operations may be adopted for the candidate bounding box that needs to be stored and the candidate bounding box that does not need to be stored. The specific screening process of the second preset condition would be described below.

In S14, if meets, adding the output tag to the candidate bounding box.

If the candidate bounding box meets the second preset condition, the candidate bounding box is added with an output tag, and the following operation S15 is performed to store the required image frame according to the output tag.

If the second preset condition is not met, the output tag is not added, and the following operation S15 is directly executed to store the monitoring video according to the output tag.

In S15, the monitoring video is stored in response to the target frame having the output tag.

After the candidate bounding box that meets the second preset condition, the video frame in which the candidate bounding box with the output tag may be saved, that is, in response to the candidate bounding box having the output tag, the monitoring video is saved, and a video segment with a predetermined time length and a predetermined number of frames is obtained.

In this embodiment, the moving target is accurately classified by neural network training, to distinguish the real moving target from the false moving target such as light and leaves, add an output mark to the target frame corresponding to the real moving target, store the image frame where the target frame with the output mark is located, and save the monitoring video. Thus, the image frames containing real moving targets may be filtered out and saved, to save storage space. Moreover, the convolutional neural network may adopt the cut image, which may reduce the number of layers of the network, control the time-consuming of the convolutional neural network, and improve the efficiency of moving target classification.

In some embodiments, as shown in FIG. 9, which is a flowchart illustrating an exemplary embodiment of operation S22 in FIG. 7 according to some embodiments of the present disclosure, that is, the target may be screened by a motion detection tracking sequence corresponding to the first preset condition. frame:

In S41, the minimum value of the number of intelligent detection frames of all target frames is obtained, and it is determined whether the number of the minimum value is greater than one.

After obtaining the motion detection tracking sequence of all candidate bounding boxes from the current frame image, if there are a plurality of moving targets, the number of intelligent detection frames in the motion detection tracking sequence corresponding to the plurality of moving targets may be sorted, and naturally obtain the minimum value of the number of intelligent detection frames of all target frames (there may be a minimum value or a plurality of minimum values). If there is only one moving target, the number of intelligent detection frames corresponding to the moving target is the minimum. That is, if there is a moving target in the current frame image, the minimum number of intelligent detection frames corresponding to this moving target must be one. If there are a plurality of moving targets in the current frame image, the minimum number of intelligent detection frames corresponding to the plurality of moving targets may be one or a lot. By judging whether the number of the minimum value is greater than one, all cases are divided into two results and different operations are performed respectively.

In S42, if the number of minimum values is not more than one, the candidate bounding box corresponding to the minimum value is selected.

If the minimum number of intelligent detection frames of all candidate bounding boxes is not more than one, the number of minimum values is only one, then the candidate bounding box corresponding to the minimum value is selected to perform the moving target corresponding to the candidate bounding box to a neural network training.

In S43, if the number of minimum values is greater than one, the maximum value of the background difference values of the plurality of candidate bounding boxes corresponding to the plurality of minimum values are obtained, and the maximum value corresponding to the candidate bounding box is selected.

If the number of intelligent detection frames of all candidate bounding boxes is greater than one, there is a plurality of points in the number of minimum values, and the maximum value of the background difference values of the area of the plurality candidate bounding boxes corresponding to the plurality of minimum values are obtained to filter the maximum value of the candidate bounding box.

Through the above operations S41-S43, it may be seen that for the current frame image, there is only one candidate bounding box screened out for neural network training. First, screening according to the number of intelligent detection frames in the motion detection tracking sequence, then screening according to the background difference of the area where the target frame is located, and finally screening one for neural network training. The moving target corresponding to the unselected candidate bounding box may also be a real moving target. This present disclosure may not discard it, but select it one by one in the subsequent operations and carries out neural network training respectively, to accurately classify each moving target. Moreover, based on the method of the target area, the embodiment may remove the interference of the non-target area, may have a strong environmental anti-interference ability, and may improve the accuracy of screening moving targets.

In some embodiments, refer to FIG. 10, which is a flowchart illustrating an exemplary embodiment of operations after operation S12 in FIG. 6 according to some embodiments of the present disclosure. That is, the neural network training is performed in the area image where the candidate bounding box is located. After classifying the moving target corresponding to the candidate bounding box and obtaining the operation of obtaining the category information of the candidate bounding box, it is also possible to include the following operations:

In S51, determining if the category information of the candidate bounding box belongs to the preset category information.

As previously mentioned, after the neural network training in the area image in the candidate bounding box, the corresponding moving target may be classified. After classification, it is determined whether or not the preset category information is determined by the category information of the moving target. The preset category information may be set according to the actual needs, that is, different convolutional neural network models by actual demand training. In most disclosures, preset category information includes category information of people, motor vehicles and non-motor vehicles. That is, the moving target of the category information of people, motor vehicles and non-motor vehicles may be defined as the real moving target, which is required to be saved, and other categories of moving targets may be defined as the false target, which may be discarded. In other disclosure scenarios, the preset category information may also be other category information, such as needed to search for a person, and will only filter out the candidate bounding box of the characters, and other candidate bounding boxes are discarded.

In S52, if it belongs to, the category information of the candidate bounding box is added to the motion detection tracking sequence corresponding to the candidate bounding box, and the number of intelligent detection frames of the candidate bounding box is added 1.

If it is determined that the category information corresponding to a candidate bounding box belongs to the preset category information, the category information of the target frame is added to its corresponding motion detection tracking sequence, and the number of intelligent detection frames of the candidate bounding box is added by 1, that is, the motion detection tracking sequence of the candidate bounding box is updated based on the results of neural network training. As mentioned earlier, when the candidate bounding box is obtained for the first time, the number of intelligent detection frames are set to the first initial value (for example, set to 0), and then the number of intelligent detection frames is increased by 1 for each neural network training (that is, intelligent detection) for the moving target. Then, when the moving target is obtained again in the next frame image and other moving targets are acquired at the same time, the number of intelligent detection frames of the moving target will not be the minimum, that is, the target frames meeting the first preset conditions will be selected from other moving targets for neural network training.

In S53, if not, the candidate bounding box in the motion detection tracking sequence may be deleted.

If it is determined that the category information corresponding to a candidate bounding box does not belong to the preset category information, it means that the moving target may be discarded, and the image frame thereof is not required to be saved, and the parameters related to the candidate bounding box in the motion detection tracking sequence may be deleted.

Further, in the embodiment, as shown in FIG. 11, which is a flowchart illustrating an exemplary embodiment of S13 in FIG. 6 according to some embodiments of the present disclosure, that is, the operation of determining whether the candidate bounding box meets the second preset condition based on the category information includes the following operation:

In S61, determining whether or not the life cycle of the corresponding candidate bounding box exceeds a specified number in the motion detection tracking sequence, wherein the specified number corresponds to the category information.

As mentioned above, after the candidate bounding box is obtained from the current frame image for the first time, the life cycle is set to the second initial value (for example, 1) in its corresponding motion detection tracking sequence, and then the corresponding life cycle in the motion detection tracking sequence of the corresponding candidate bounding box is added by 1 every time the same candidate bounding box is obtained in other image frames. It may be seen that the life cycle of the candidate bounding box may represent the number of times it appears. Therefore, after updating the motion detection tracking sequence according to the output result of the neural network, that is, after updating the number of intelligent detection frames and life cycle of the target frame and obtaining the category information of the target frame, first determining whether the life cycle of the corresponding candidate bounding box exceeds the specified number firstly, wherein the specified quantity corresponds to the category information of the candidate bounding box. That is, for candidate bounding boxes with different category information, different specified quantities may be set, the same specified quantity may also be set, which may be set according to the actual application scenario requirements, which is not limited in the present disclosure. For example, if the specified number of motor vehicles is set to x, and the life cycle of the candidate bounding box corresponding to the motor vehicle is determined to be y after neural network training, whether it is necessary to add an output tag to the candidate bounding box may be judged by judging the size relationship between x and y.

In S62, if it exceeds, the candidate bounding box is considered to meet the second preset condition and performing operation S14.

If the life cycle of the corresponding candidate bounding box exceeds the specified number, for example y>x, the candidate bounding box is considered to perform operation S14, that is, the corresponding candidate bounding box may be added to the output tag, and operation S63 below may be performed.

If it does not exceed, performing the following operation S63 directly, and continue to add the life cycle of the candidate bounding box.

After the operation of adding the output tag to the candidate bounding box, it may illustrate the candidate bounding box that has been obtained from the current frame image, and the motion detection tracking sequence of each candidate bounding box, and according to the part of parameters in the motion detection tracking sequence, filtering out a candidate bounding box for neural network training, and updating the motion detection tracking sequence of the candidate bounding box according to the results of neural network training, and determining whether or not the candidate bounding box is added to the output tag based on the updated motion detection tracking sequence. That is, refer to FIG. 11, the processing of the current frame image may be ended, regardless of whether the candidate bounding box has been added to the output tag, including the following operations:

In S63, obtaining the next frame image as the current frame image, and in response to the current frame image having the moving target, returning the candidate bounding box corresponding to all moving targets obtained from the current frame image, and obtaining the operation of motion detection tracking sequence of each candidate bounding box.

After the processing of the current frame image is completed, starting the processing of the next frame image. That is, obtaining the next frame image as the current frame image, restarting the above operations of the current frame image, that is, returning to the above operation S21 until the screened target frame is added to the output tag or not. After that, the next cycle may be started, and then the processing of the whole monitoring video may be completed. If the monitoring video is updated in real time, the processing method provided in the present disclosure may also be real-time.

The present embodiment updates the motion detection tracking sequence of the target frame according to the results of the neural network training, which is convenient for subsequent image frames that need to be stored according to the updated motion detection tracking sequence. Further, because of the algorithm of the embodiment, the candidate bounding box corresponding to most of the moving targets may not be entered into the neural network twice, but the candidate bounding box that is the most likely of the real moving target may be entered into the neural network, so that the moving target corresponding to each candidate bounding box may be accurately classified, thereby saving the storage space of the monitoring video.

Figure 12:
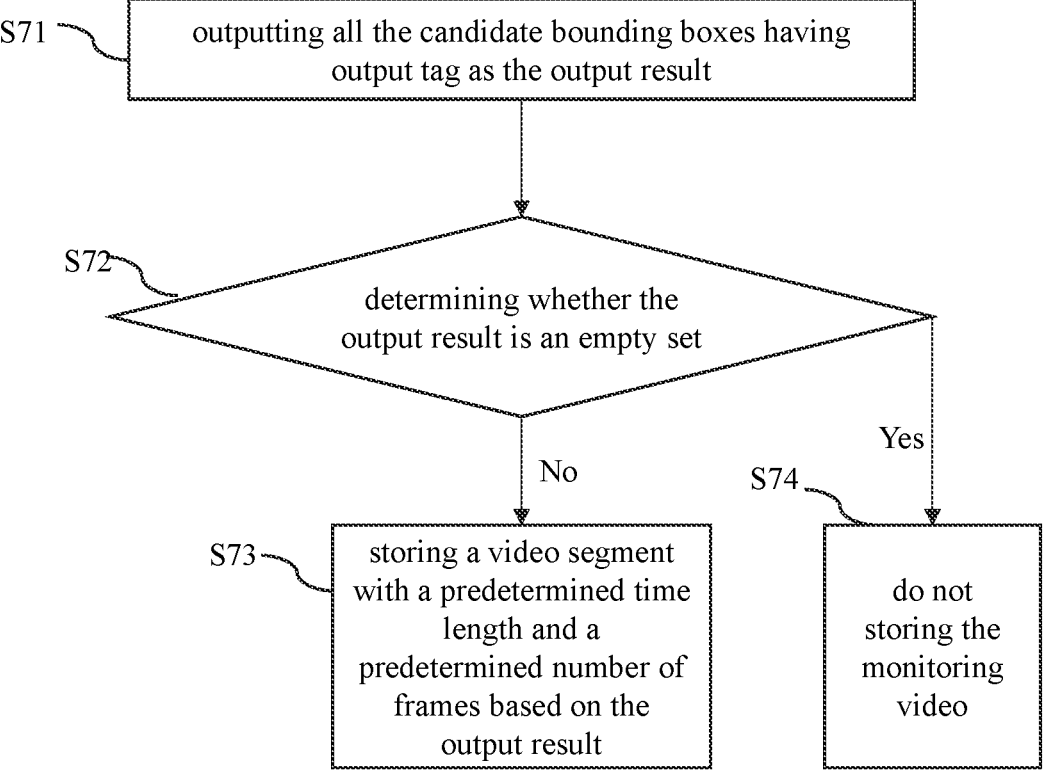
FIG. 12 is a flowchart illustrating an exemplary embodiment of operation S15 in FIG. 6 according to some embodiments of the present disclosure.

In some embodiments, refer to FIG. 12, which is a flowchart illustrating an exemplary embodiment of operation S15 of FIG. 6 according to some embodiments of the present disclosure. That is, in response to the candidate bounding box having the output tag, the operation of saving the monitoring video may include the following:

In S71, outputting all the candidate bounding boxes having output tag as the output result.

When a predetermined number of image frame processing is completed, some candidate bounding boxes may be added to the output tag, and the image frames thereof need to be stored. At this time, the output tag may be stored. All candidate bounding boxes are output to the output result, and the monitoring video is stored based on the output result.

In S73, storing a video segment with a predetermined time length and a predetermined number of frames based on the output result, wherein the video segment includes at least a current frame image corresponding to all of the candidate bounding boxes in the output result.

After obtaining the output result, a video segment of a predetermined time length and a predetermined frame number is stored according to the set time length and frame number. The image frame where the candidate bounding box that may be having an output result exceeds the number of predetermined frames, which requires to discard a part of it, preferably based on the predetermined time length intercepting a part of the image frame, and then selecting an image frame of a predetermined frame number between a predetermined time. It is also possible to set the operation of saving the video after being set to the predetermined number of image frames, and then continue to process the next frame image. That is, the saved video segment may include all or a part of the current frame image corresponding to all target frames of the output results.

Further, refer to FIG. 12, because the output result obtained through operation S71 may not contain any candidate bounding box, operation S71, after the operation of outputting all candidate bounding boxes having output tag as the output result, also includes the following operations:

In S72, determining whether the output result is an empty set.

If the output result is not an empty set, performing the operation of storing a video segment with a predetermined time length and a predetermined number of frames based on the output result, that is, performing operation S73.

If the output result is an empty set, it means that there is no candidate bounding box having the output tag, that is, there is no need to store the monitoring video, as described in operation S74 in FIG. 12.

Based on the intelligent detection method, the embodiment may ensure the intelligent recognition and detection of moving targets covering the whole scene within a certain number of frames, so as to save the video segment with a predetermined time length and a predetermined number of frames, which may not only make the algorithm accurate, but also save the time occupied by the algorithm and the storage space occupied by storing monitoring video.

Refer to FIG. 13, which is a flowchart illustrating another exemplary process for processing monitoring video according to some embodiments of the present disclosure. The purpose of the embodiment is to process a segment of monitoring video, which is to store an image frame including a specified type of moving target as a video segment with a predetermined time length and a predetermined number of frames, specifically including the following operations:

In S81, in response to the current frame image of the monitoring video having the moving targets, obtaining the candidate bounding boxes corresponding to all moving targets from the current frame image, and obtaining the motion detection tracking sequence of each candidate bounding box.

Firstly, obtaining the current frame image from the monitoring video, and obtaining the motion detection tracking sequence of each target frame, including the life cycle of each target frame, the number of intelligent detection frames and the background difference of the current area. When a candidate bounding box is obtained for the first time, its life cycle is set to 1 and its number of intelligent detection frames is set to 0. Supposed that three target frames are A, B and C obtained in the current frame image, in which target frames A and B are obtained for the first time, their life cycle is 1, the number of intelligent detection frames is 0, target frame C is obtained for the second time, its life cycle is 2, it has been input into the convolutional neural network once, and the number of intelligent detection frames is 1.

In S82, obtaining the minimum value of the intelligent detection frames of all candidate bounding boxes, and determining whether the number of the minimum value is greater than one.

The minimum value of the intelligent detection frame in three candidate bounding boxes A, B, and C is 0, and the numbers of the minimum value are two (A and B).

In S83, if it is greater than one, obtaining the maximum value of the background difference of the area corresponding to the plurality of minimum values, and screening the candidate bounding box corresponding to the maximum value.

The minimum values are two, greater than one, obtaining the maximum value of the background difference of the candidate bounding boxes A and B, and screening candidate bounding box corresponding to the maximum, which is supposed as the candidate bounding box A.

In S84, if it is not greater than one, screening the candidate bounding box corresponding to the minimum value.

In S85, a neural network training in the area image of the screened candidate bounding box to classify the moving target corresponding to the candidate bounding box.

Cutting out the area image of the candidate bounding box A, inputting into the convolutional neural network, classifying the moving target corresponding to the candidate bounding box A, supposing that the candidate bounding box A is a motor vehicle class after the classification.

In S86, determining if the category information of the candidate bounding box belongs to the preset category information.

After classification, the candidate bounding box A is a motor vehicle class, which belongs to the preset category information.

In S87, if it belongs, adding the category information of the candidate bounding box to the motion detection tracking sequence corresponding to the candidate bounding box, and adding 1 to the number of intelligent detection frames of the candidate bounding box.

If the candidate bounding box is a motor vehicle class and belongs to the preset category information, the category information is added to its motion detection tracking sequence, and adding 1 to the number of intelligent detection frames, that is, the number of intelligent detection frames of target frame a is changed from 0 to 1.

In S88, if it does not belong to, deleting the candidate bounding box of the motion detection tracking sequence.

In S89, determining whether or not the life cycle of the corresponding candidate bounding box of the motion detection tracking sequence exceeds the specified number.

At this time, the life cycle of candidate bounding boxes A and B are 1, and the life cycle of candidate bounding box C is 2, supposing that neither of them exceeds the specified quantity.

In S810, if it exceeds, adding an output tag to the candidate bounding box.

In S811, if it does not exceed, determining whether or not the preset last frame has been processed.

Whether the life cycle of the target frame exceeds or does not exceed the specified number, adding or not adding an output tag to the target frame in the current frame image. At this time, the processing of the current frame image may be ended. It is necessary to judge whether there is another frame image, that is, whether the preset last frame has been processed. The preset last frame may be the last frame of the monitoring video or any one of specified frames.

In S812, if the preset last frame is not processed, obtaining the next frame image as the current frame image, and returning to operation S81, re-obtaining the candidate bounding box. Supposing that the candidate bounding box A and C are obtained again, then the life cycles of the candidate bounding box A, B, and C are 2, 1 and 3, respectively, the number of intelligent detection frames is 1, 0 and 2, respectively, and the candidate bounding box B is screened for neural network training. Since this type, until the life cycle of a candidate bounding box exceeds its corresponding specified number, adding to the output tag. Thereafter, it may start another loop to complete the processing of the preset last frame. Supposing that the last candidate bounding boxes A and C are added to the output tag, and the moving target corresponding to the candidate bounding box B does not belong to the preset category information, and may be deleted.

In S813, if the preset last frame has been processed, outputting all candidate bounding boxes having output tags as the output result.

The candidate bounding boxes A and C are both added to the output tag, and the candidate bounding boxes A and C are output as the output result.

In S814, determining whether the output result is an empty set.

Judging whether or not the output result of the candidate bounding box A and C is empty set.

In S815, if it is not an empty set, a video segment with a predetermined time length and a predetermined number of frames is stored based on the output results.

If the output result containing the candidate bounding boxes A and C is not an empty set, exporting all image frames of the candidate bounding boxes A and C, storing the video segment in a predetermined time length and a predetermined number of frames.

In S816, if it is an empty set, not storing the monitoring video.

If the output result is an empty set, it means that the moving target that may be not preset category information is not required, and the monitoring video may be not required.

This embodiment may use neural network training to accurately classify moving targets, thereby distinguishing between real moving targets and false targets, like lights, leaves, or the like, adding output tag to the real moving target, and storing the image frame where the candidate bounding box with output tag is located, saving the monitoring video, so that the image frame containing the true motion target may be screened and saved, to save storage space. Moreover, the convolutional neural network may adopt the cut image, which may reduce the number of layers of the network, control the time-consuming of the convolutional neural network, and improve the efficiency of moving target classification.

Figure 14:
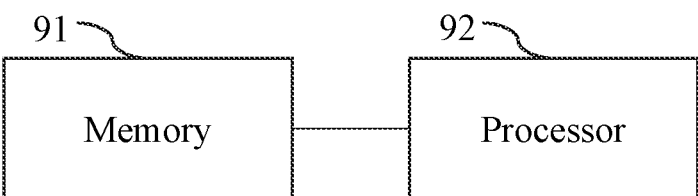
FIG. 14 is a structural diagram illustrating an exemplary device for processing monitoring video according to some embodiments of the present disclosure.

The embodiment may also provide a device for processing monitoring video. As refer to FIG. 14, which is a structural diagram illustrating an exemplary device for processing monitoring video according to some embodiments of the present disclosure. The device may include a memory 91 and a processor 92. The program instructions may be stored on the memory 91. The processor 92 may be configured to execute the program instruction to realize the processing method of monitoring video according to any of the above embodiments. For details, may refer to any of the above embodiments, which may not be described herein.

Figure 15:
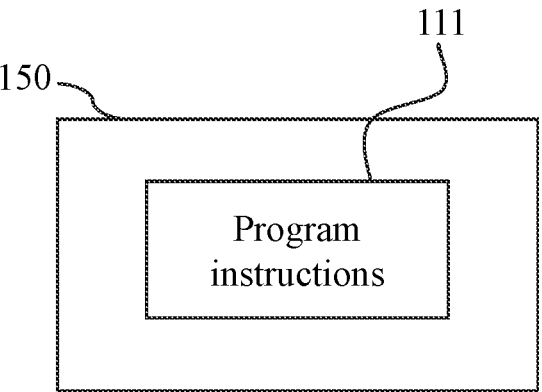
FIG. 15 is a configuration diagram illustrating an exemplary computer readable storage medium according to some embodiments of the present disclosure.

Further, the embodiment may also provide a computer readable storage medium, as refer to the FIG. 15, which is a configuration diagram illustrating an exemplary computer readable storage medium according to some embodiments of the present disclosure. Program instructions 111 may be stored on the storage medium 150. The program instructions 111 may be executed by a processor to implement with a method for processing monitoring video as described above in any of the above embodiments. For details, may refer to any of the above embodiments, which may not be described herein.

It will be apparent to those skilled in the art that various changes and modifications can be made in the present disclosure without departing from the spirit and scope of the disclosure. In this manner, the present disclosure may be intended to include such modifications and variations if the modifications and variations of the present disclosure are within the scope of the appended claims and the equivalents thereof.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or features may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an subject oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, or figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques.

Notwithstanding that the numerical ranges and parameters setting forth the broad scope of some embodiments of the application are approximations, the numerical values set forth in the specific examples are reported as precisely as practicable. In some embodiments, a classification condition used in classification or determination is provided for illustration purposes and modified according to different situations. For example, a classification condition that "a value is greater than the threshold value" may further include or exclude a condition that "the probability value is equal to the threshold value."

What is claimed is:

1. A method for video processing, comprising:
   determining a target bounding box from an image frame in a video;
   obtaining at least one candidate bounding box corresponding to at least one moving target from the image frame;
   obtaining a motion detection tracking sequence of each target frame in the video; and
   screening a candidate bounding box corresponding to a motion detection tracking sequence meeting a first preset condition, comprising:
      obtaining a minimum value of at least one number of intelligent detection frames of the at least one moving target in at least one historical image frame, the number of intelligent detection frame indicating a count of times that at least one associated bounding box corresponding to the candidate bounding box from the at least one historical image frame in the video is processed by a recognition model;
      determining whether the number of the minimum value is greater than one;
      selecting a candidate bounding box corresponding to the minimum value as the target bounding box if the number of minimum values is not greater than one;
      obtaining a maximum value of background difference values of the at least one candidate bounding box corresponding to the minimum value if the number of minimum values is greater than one, the background difference value indicating an absolute value of a pixel difference between a current frame image and a background image; and
      selecting a candidate bounding box corresponding to the maximum value of background difference values as the target bounding box;
   determining a classification result of a subject in the target bounding box by processing the target bounding box using the recognition model; and
   determining one or more target image frames to be saved in the video based on the classification result.

2. The method of claim 1, wherein the obtaining the at least one candidate bounding box from the image frame includes:
   obtaining the background image of the image frame;
   determining a foreground image of the image frame based on the background image and the image frame;
   determining the at least one candidate bounding box based on the foreground image.

3. The method of claim 1, wherein the determining the one or more target image frames to be saved in the video based on the classification result, includes:
   determining the one or more target image frames to be saved based on the image frame corresponding to determining that the classification result of the subject includes a specific type, and that the target bounding box satisfies a second condition.

4. The method of claim 3, wherein the second condition is related to a count of occurrences of the target bounding box and at least one associated bounding box corresponding to the target bounding box in the video.

5. The method of claim 1, further including:
   determining a recognition bounding box by processing the target bounding box using the recognition model, wherein the recognition bounding box is configured to mark the subject in the target bounding box.

6. A system for video processing, comprising:
   at least one storage device including a set of instructions; and
   at least one processor configured to communicate with the at least one storage device, wherein when executing the set of instructions, the at least one processor is configured to direct the system to perform operations including:
   determining a target bounding box from an image frame in a video;
   obtaining at least one candidate bounding box corresponding to at least one moving target from the image frame;
   obtaining a motion detection tracking sequence of each target frame in the video; and
   screening a candidate bounding box corresponding to a motion detection tracking sequence meeting a first preset condition, comprising:
      obtaining a minimum value of at least one number of intelligent detection frames of the at least one moving target in at least one historical image frame, the number of intelligent detection frame indicating a count of times that at least one associated bounding box corresponding to the candidate bounding box from the at least one historical image frame in the video is processed by a recognition model;
      determining whether the number of the minimum value is greater than one;

selecting a candidate bounding box corresponding to the minimum value as the target bounding box if the number of minimum values is not greater than one;

obtaining a maximum value of background difference values of the at least one candidate bounding box corresponding to the minimum value if the number of minimum values is greater than one, the background difference value indicating an absolute value of a pixel difference between a current frame image and a background image; and selecting a candidate bounding box corresponding to the maximum value of background difference values as the target bounding box;

determining a classification result of a subject in the target bounding box by processing the target bounding box using the recognition model; and determining one or more target image frames to be saved in the video based on the classification result.

7. The system of claim 6, wherein the obtaining the at least one candidate bounding box from the image frame includes:

obtaining the background image of the image frame;

determining a foreground image of the image frame based on the background image and the image frame;

determining the at least one candidate bounding box based on the foreground image.

8. The system of claim 7, wherein the obtaining the background image of the image frame includes:

determining the background image by processing the video using a Gaussian background modeling algorithm.

9. The system of claim 6, wherein the determining the one or more target image frames to be saved in the video based on the classification result, includes:

determining the one or more target image frames to be saved based on the image frame corresponding to determining that the classification result of the subject includes a specific type, and that the target bounding box satisfies a second condition.

10. The system of claim 9, wherein the second condition is related to a count of occurrences of the target bounding box and at least one associated bounding box corresponding to the target bounding box in the video.

11. The system of claim 6, further including:

determining a recognition bounding box by processing the target bounding box using the recognition model, wherein the recognition bounding box is configured to mark the subject in the target bounding box.

12. A non-transitory computer readable medium, comprising executable instructions that, when executed by at least one processor, direct the at least one processor to perform a method, the method comprising:

determining a target bounding box from an image frame in a video;

obtaining at least one candidate bounding box corresponding to at least one moving target from the image frame;

obtaining a motion detection tracking sequence of each target frame in the video; and screening a candidate bounding box corresponding to a motion detection tracking sequence meeting a first preset condition, comprising:

obtaining a minimum value of at least one number of intelligent detection frames of the at least one moving target in at least one historical image frame, the number of intelligent detection frame indicating a count of times that at least one associated bounding box corresponding to the candidate bounding box from the at least one historical image frame in the video is processed by a recognition model;

determining whether the number of the minimum value is greater than one;

selecting a candidate bounding box corresponding to the minimum value as the target bounding box if the number of minimum values is not greater than one;

obtaining a maximum value of background difference values of the at least one candidate bounding box corresponding to the minimum value if the number of minimum values is greater than one, the background difference value indicating an absolute value of a pixel difference between a current frame image and a background image; and selecting a candidate bounding box corresponding to the maximum value of background difference values as the target bounding box;

determining a classification result of a subject in the target bounding box by processing the target bounding box using the recognition model; and determining one or more target image frames to be saved in the video based on the classification result.

13. The method of claim 3, wherein the method further includes:

storing a video segment with a predetermined time length and a predetermined number of frames based on the classification result.

14. The method of claim 3, wherein the method further includes:

determining a number of additional image frames to be saved according to remaining space of a storage device; and controlling the storage device to save the image frame.

* * * * *